(12) United States Patent
Lössov et al.

(10) Patent No.: US 11,625,969 B2
(45) Date of Patent: Apr. 11, 2023

(54) AUTOMATED PARCEL TERMINAL

(71) Applicant: Cleveron AS, Viljandi (EE)

(72) Inventors: Remi Lössov, Viljandi (EE); Anu Koppel, Viljandi (EE); Ott Pabut, Tallinn (EE); Rein Saetalu, Viljandimaa (EE); Arno Kütt, Viljandimaa County (EE); Mihkel Ilp, Tartumaa (EE)

(73) Assignee: Cleveron AS, Viljandi (EE)

( * ) Notice: Subject to any disclaimer, the term of this patent is extended or adjusted under 35 U.S.C. 154(b) by 363 days.

(21) Appl. No.: 16/903,421

(22) Filed: Jun. 17, 2020

(65) Prior Publication Data

US 2020/0402340 A1 Dec. 24, 2020

Related U.S. Application Data

(60) Provisional application No. 62/862,773, filed on Jun. 18, 2019.

(51) Int. Cl.
*G07F 11/16* (2006.01)
*G06Q 10/0836* (2023.01)
*G07F 11/42* (2006.01)

(52) U.S. Cl.
CPC ......... *G07F 11/16* (2013.01); *G06Q 10/0836* (2013.01); *G07F 11/42* (2013.01)

(58) Field of Classification Search
CPC .......... A47G 29/1201; A47G 2029/149; G07F 11/16; G07F 11/42; G07F 11/10; G07F 11/1657; G07F 17/12; G07F 17/13; G06Q 10/0836; G06Q 20/18; B65G 1/04; B65G 1/137; B65G 1/1373; B65G 2201/0285; B65G 2203/0208; B65G 2203/04; E05G 1/06

USPC ...................................................... 232/24–26
See application file for complete search history.

(56) References Cited

U.S. PATENT DOCUMENTS

| | | | |
|---|---|---|---|
| 8,145,351 B2 * | 3/2012 | Schininger | G07F 17/13 221/12 |
| 8,628,289 B1 * | 1/2014 | Benedict | B65G 1/0478 414/217 |
| 9,120,624 B1 * | 9/2015 | Cassady | G06Q 10/0836 |
| 9,242,810 B2 | 1/2016 | Lossov et al. | |
| 9,604,259 B2 | 3/2017 | Lossov et al. | |
| 9,745,130 B1 * | 8/2017 | Rawal | G06Q 10/0875 |
| 10,043,151 B1 | 8/2018 | Zhu et al. | |
| 10,114,996 B2 | 10/2018 | Lossov et al. | |
| 10,357,804 B2 | 7/2019 | Must et al. | |
| 10,621,401 B2 | 4/2020 | Lossov et al. | |

(Continued)

FOREIGN PATENT DOCUMENTS

| | | | | |
|---|---|---|---|---|
| CA | 2775847 A1 | 3/2011 | | |
| CA | 3050144 A1 * | 2/2020 | | B65G 1/04 |

(Continued)

OTHER PUBLICATIONS

Australian Examination Report No. 1 issued in application No. 2020204032, dated May 6, 2021, 4 pages.

(Continued)

*Primary Examiner* — William L Miller
(74) *Attorney, Agent, or Firm* — Meunier Carlin & Curfman LLC

(57) ABSTRACT

An economic self-service terminal with simple but high safety features is described here.

9 Claims, 17 Drawing Sheets

(56) References Cited

U.S. PATENT DOCUMENTS

| | | | |
|---|---|---|---|
| 11,191,382 B2* | 12/2021 | Likins | A47G 29/1248 |
| 11,200,773 B2* | 12/2021 | Middelberg | G07F 9/10 |
| 11,479,413 B2* | 10/2022 | Must | G07F 17/0064 |
| 11,524,844 B2* | 12/2022 | Clarke | B65G 1/0464 |
| 2008/0121646 A1* | 5/2008 | Schininger | G07F 17/12 |
| | | | 221/12 |
| 2012/0029687 A1 | 2/2012 | Hagen et al. | |
| 2013/0264381 A1* | 10/2013 | Kim | G07F 17/13 |
| | | | 232/24 |
| 2015/0158679 A1 | 6/2015 | Lõssov et al. | |
| 2015/0225216 A1 | 8/2015 | Koyama | |
| 2015/0252603 A1 | 9/2015 | Cianetti | |
| 2015/0302351 A1* | 10/2015 | Cassady | B65G 1/137 |
| | | | 705/339 |
| 2016/0176633 A1 | 6/2016 | Tanaka et al. | |
| 2017/0053099 A1 | 2/2017 | Coughlin et al. | |
| 2018/0244469 A1* | 8/2018 | Testa | G07F 11/165 |
| 2018/0304311 A1* | 10/2018 | Must | B07C 3/087 |
| 2018/0305125 A1* | 10/2018 | Guo | B66F 9/063 |
| 2019/0168392 A1* | 6/2019 | Väin | G06Q 10/00 |
| 2019/0344965 A1* | 11/2019 | Wilkinson | G07F 11/42 |
| 2020/0062502 A1 | 2/2020 | Kutt et al. | |
| 2020/0104558 A1 | 4/2020 | Lossov et al. | |
| 2021/0370988 A1* | 12/2021 | Cheng | B60P 3/007 |
| 2022/0081211 A1* | 3/2022 | Kütt | G07F 17/13 |
| 2022/0245373 A1* | 8/2022 | Lõssov | G07F 11/42 |
| 2022/0356017 A1* | 11/2022 | Romano | B07C 5/36 |

FOREIGN PATENT DOCUMENTS

| | | |
|---|---|---|
| CN | 104370044 A | 2/2015 |
| CN | 205855095 U | 1/2017 |
| CN | 106976674 A | 7/2017 |
| CN | 206407465 U | 8/2017 |
| CN | 206456936 U | 9/2017 |
| CN | 213371254 U | 6/2021 |
| DE | 19927248 A1 | 12/2000 |
| EP | 1061013 A1 | 12/2000 |
| EP | 2881905 A1 | 6/2015 |
| EP | 3142085 A1 | 3/2017 |
| EP | 3392848 A1 | 10/2018 |
| JP | S63154581 U | 10/1988 |
| JP | H0797009 A | 4/1995 |
| JP | H11171305 A | 6/1999 |
| JP | 2017013948 A | 1/2017 |
| WO | 2011036498 A2 | 3/2011 |
| WO | 201806872 A1 | 1/2018 |

OTHER PUBLICATIONS

Japanese office action issued in application No. 2020-104534, dated Jun. 4, 2021, 6 pages.

Search Report of corresponding Chinese application No. 2020105620311, completed Jul. 21, 2021, dated Jul. 26, 2021, 6 pages.

* cited by examiner

AUTOMATED PARCEL TERMINAL

PRIORITY

This application claims priority of U.S. provisional application No. 62/862,773 filed on Jun. 18, 2019 the contents of which is fully incorporated herein by reference.

FIELD OF THE INVENTION

This invention relates to the field of self-service parcel terminals, more specifically to the field of methods for delivery, sending, receiving and storing parcels, packages, mail and other postal objects.

BACKGROUND

Different parcel terminal solutions and processes used to control inserting and discharging postal objects are known from the prior art in which each parcel is stored in a separate locker or shelf. There are various known solutions for automated warehouse stacking solutions, e.g. US2016176633 and JP2017013948. For these kinds of solutions there are also numerous known solutions for cranes and loaders to move the parcels. Examples of such solutions are described in publications WO201806872 and US20150225216, among others.

Automated warehouse solutions, however, do not necessarily have features that are essential for self-service parcel terminal. These devices need to be designed for use of non-trained users and therefore the safety and simplicity will need to be addressed.

The simplest type of self-service terminal is a locker-type of terminal, where the customer has access to a specific locker. Examples of these devices and related methods are disclosed for example in U.S. Pat. Nos. 9,604,259 and 10,043,151, among others. In more complicated and advanced solutions the self-service terminal generally has an entry point at which parcels may be inserted into the terminal and received from the terminal. These devices generally have a transporting device moving inside the terminal and loading deposited parcels into shelves inside the terminal. Thus, the terminals have various automated moving parts. Examples of storage terminals with moving transporting device are disclosed for example in WO2018068072 or US 2012/0029687, among others.

When the system is a self-service terminal the terminal will be operated in addition to trained couriers by non-trained customers receiving their parcels. For this reason, it is utmost important that the terminal works in a way that no physical harm can be caused to non-trained users. The most obvious hazard would be the customer somehow getting his/her hands or arms stuck between closing doors or the customer otherwise being hurt by moving parts when operating the terminal.

In the known art, the terminals generally speaking have relatively complicated constructions preventing harm to the individual operating the terminal. As an example of the known art U.S. Pat. No. 9,242,810 provides a self-service parcel terminal for storing parcels of different sizes. The terminal comprises a gripping mechanism and lift system for moving parcels in the terminal between the shelves and the slot for inserting/delivering parcels. The slot for inserting and delivering parcels has a motorized door system with multiple doors.

The currently known solutions have complicated constructions, including moving mast with various levels of complexity and various motors or drives to operate terminal doors for parcel entry and/or retrieval. In the currently known solutions safe operation of the terminals with complicated systems to control the door opening and closing also requires complicated safety systems. Such complicated systems also increase the costs of the devices which makes them too expensive for most of the small or middle-sized retail stores to use.

The speed of the parcel insertion and extraction is an essential feature of parcel terminals. In the previously known art, there are various methods to increase the speed of parcel insertion and extraction, however many of these methods require complicated structures, e.g. several insertion/retrieval areas. In self-service parcel terminal with one insertion and extraction point the movement speed of a mast and a loader lift are generally maximized to the strength limits of the participating elements. This approach increases the costs of the parcel terminals due to requirement of special parts and due to running the devices at their limits.

The current disclosure provides solutions to these problems as well as to others and provides a self-service parcel terminal that is fast, safe, durable and affordable.

SUMMARY

The current disclosure solves the above described shortcomings of the previous art and others. The disclosure provides a self-service terminal with an entry point that has a safe door opening system controlled mechanically by a tray inserted into the console. Closing the doors is also controlled mechanically when the tray is pulled away from the console. The self-service terminal according to this invention provides a structurally simplified moving mast and a safe door opening and closing system that does not require a separate motor or drive. Accordingly, the solution provided here is safe but economically more affordable than the devices known in the prior art. The device according to this disclosure can also be constructed to have a small size. Moreover, the device according to this disclosure operates quietly. With these features the device is specifically desirable for small retailers.

It is an object of this invention to provide an automated parcel terminal comprising: an outer shell and an internal structure; the outer shell comprising an external console for user identification, communication between the user and the terminal, and for retrieve or deposit a parcel; the internal structure comprising: at least one row of vertical shelf supports to adapt a multitude of parcel trays in between the supports, a mast moving horizontally along a top rail and a bottom rail and along the at least one row of shelf supports, a loader configured to move vertically on the mast and being capable of gripping a parcel tray with or without a parcel via an attachment mechanism, and moving the tray horizontally in direction perpendicular to moving direction of the mast, and an internal console located between two shelf supports within the at least one row of vertical supports; the internal console comprising: a support structure onto which a pair of parcel tray guiderails are attached, a console sliding door, light curtains, and a mechanism to operate the sliding door, wherein the mechanism to operate the sliding door comprises a horizontal slide supporting a swivel lock mechanism, a vertical slide comprising a counterweight, and an L-shaped drive belt loop connecting the swivel lock mechanism, the counterweight, and the console sliding door such that the door moves upward to a closed position and downward to open position via front-to-back movement of the swivel lock mechanism on the horizontal rail, and wherein the door sliding downward to an open position is initiated when a parcel tray is pushed by the loader on to an end position on the guiderails, and the door sliding upward to a closed position is initiated when the parcel tray is pulled off by the loader from the guiderails and the counterweight moves the swivel lock mechanism to end of the horizontal slide where locking teeth engage with a locking pin so as to make it impossible to open the door from outside.

According to certain embodiments the attachment mechanism of the loader comprises a horizontally moving magnetic head on the loader and the parcel trays having a metal portion for an electromagnet of the magnetic head to attach.

According to certain embodiments the mast comprises a mast motor on top of the mast structure configured to move the mast horizontally in the parcel terminal and a lift assembly configured to move the loader vertically along the mast, wherein the lift assembly comprises: two vertical hollow beams both of which have vertical guiding grooves for adapting rollers of the loader to movably attach the loader in between the beams; a lift drive motor and a drive pulley system on top of the mast structure; and two open ended drive belts running partially inside the beams and having one end of each belt connected to the loader and the other end of each belt connected to a counterweight and the counter weight moving vertically inside the hollow beam and being guided along grooves on the inner surface of the beam.

According to certain embodiments the hollow beams of the lift assembly have a flat U-shape cross section and the counterweight moves vertically in the inner space of the U-shape.

According to certain embodiments, the counterweights of the lift assembly have sliders fitting into a groove in the surface of the hollow beam for guiding the movement of the counterweight.

It is another object of this invention to provide a mechanism to open and close a sliding door of an automated parcel terminal console, wherein the mechanism comprises an L-shaped continuous drive belt loop having a horizontal part and a vertical part, the drive belt looping around pulleys at both ends of its L-shaped form; a carriage supporting a swivel lock mechanism connected to the horizontal part of the drive belt, a counterweight connected to a back side of the vertical part of the drive belt loop and the sliding door connected to the front side of the vertical part of the drive belt loop, wherein the carriage is configured to move forward when a parcel tray is inserted into the internal console causing the drive belt loop to move to direction pulling the sliding door downward into an open position, and the carriage further being configured to move backward when the parcel tray is removed from the console causing the drive belt to move to direction pulling the sliding door upward into a closed position and the swivel lock to move to a locked position preventing opening of the door from outside.

It is yet another object of the invention to provide a method to operate a sliding door of a self-service parcel terminal, wherein the method comprises: opening the sliding door when: upon a loader inserting a parcel tray onto tray guiderails in an internal console of the terminal, end of the parcel tray engages with a swivel lock mechanism supported on a carriage on a horizontal slide in the internal console causing the mechanism to disengage from a locking pin, and upon the loader pushing the tray further into the internal console along the tray guiderails the carriage connected to a counterweight and to the sliding door, moves forward along the horizontal slide and causes the counterweight to move upward along a vertical slide and the sliding door moves down in an open position; and closing the sliding door when a loader pulling a parcel tray back from the internal console of the terminal, the carriage connected to the counterweight and to the sliding door, moves backward along the horizontal slide and causes the counterweight to move downward along a vertical slide and the sliding door moves upward in a closed position; and locking the door when end of the parcel tray disengages with a swivel lock mechanism on a horizontal slide in the console causing the swivel lock mechanism to engage with a locking pin locking the door in closed position.

According to certain embodiments the carriage, the counterweight and the sliding door are connected via an L-shaped drive belt loop.

According to certain embodiments the drive belt loop is arranged to L-shaped form via pullies at each end of the horizontal and vertical slides.

It is a further object of the invention to provide a computerized method to optimize operation of a parcel terminal having a horizontally moving mast and a vertically moving loader attached thereto, wherein the method comprises: obtaining coordinates of initial horizontal location of the mast and coordinates of initial vertical location of the loader; obtaining coordinates of desired horizontal location of the mast and coordinates of the desired vertical location of the loader; calculating a horizontal travel distance and a vertical travel distance based on the obtained coordinates of the initial horizontal location and the vertical location; calculating a horizontal travel time with a maximum speed based on the calculated horizontal travel distance and a vertical travel time with a maximum speed based on the calculated vertical distance; determining longer of the calculated horizontal and vertical travel times; and when the vertical travel time is longer, adjusting the horizontal speed of the mast such that the horizontal travel time is same as the vertical travel time, and when the horizontal travel time is longer, adjusting the vertical speed of the loader such that the vertical travel time is same as the horizontal travel time.

Figure 1:
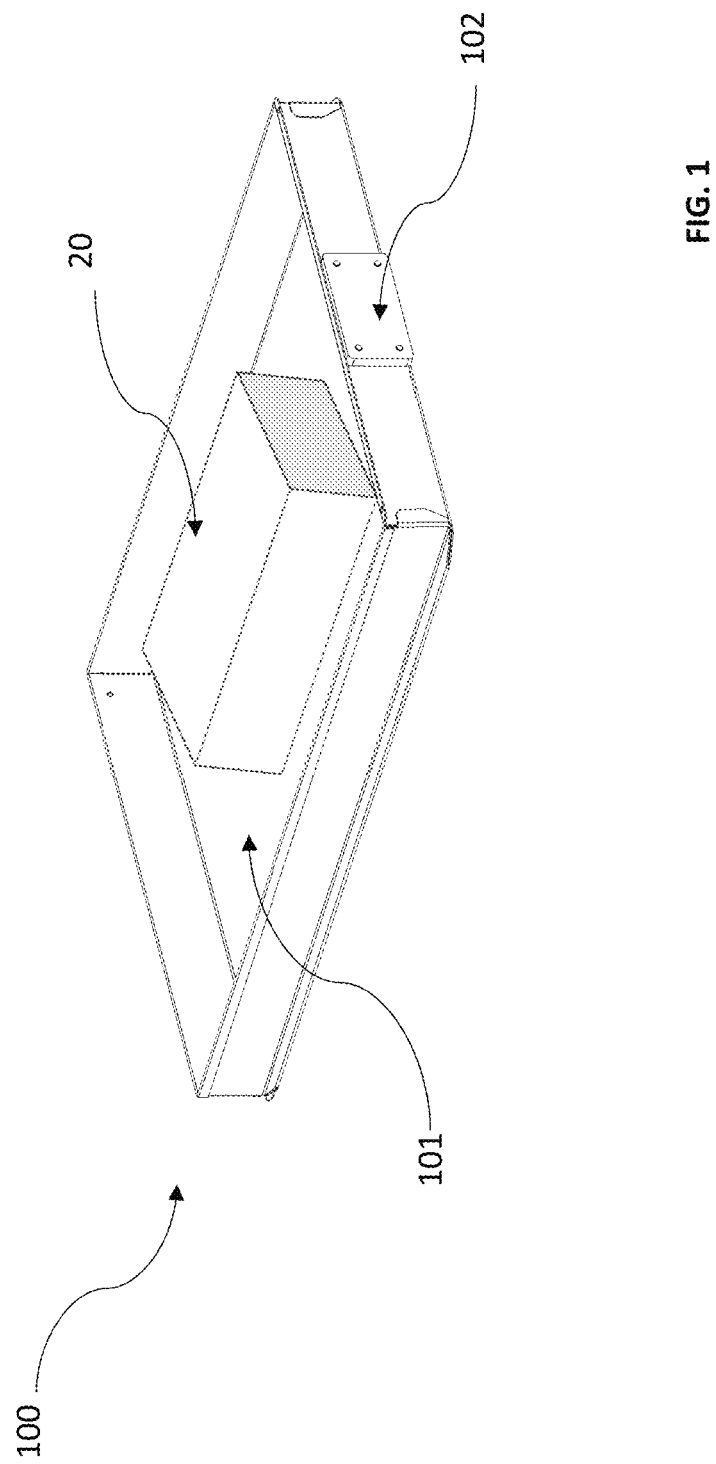
FIG. 1 is an illustration of the parcel tray 100. The figure shows a parcel 20 on the tray base 101. On one end of the tray is shown a metal plate 102.

Movement of the swivel lock mechanism is arranged such that it is controlled by insertion and removal of the parcel tray into and from the internal console. When the parcel tray 100 is not engaged with the swivel lock mechanism 508, the force from the counterweight (509 shown in FIG. 10) moves the swivel lock mechanism backward (away from the sliding door of the internal console) on the horizontal slides 505 where the locking teeth 513 engage with the locking pin 514 due to the pressure from a spring mechanism 519.

Figure 12:
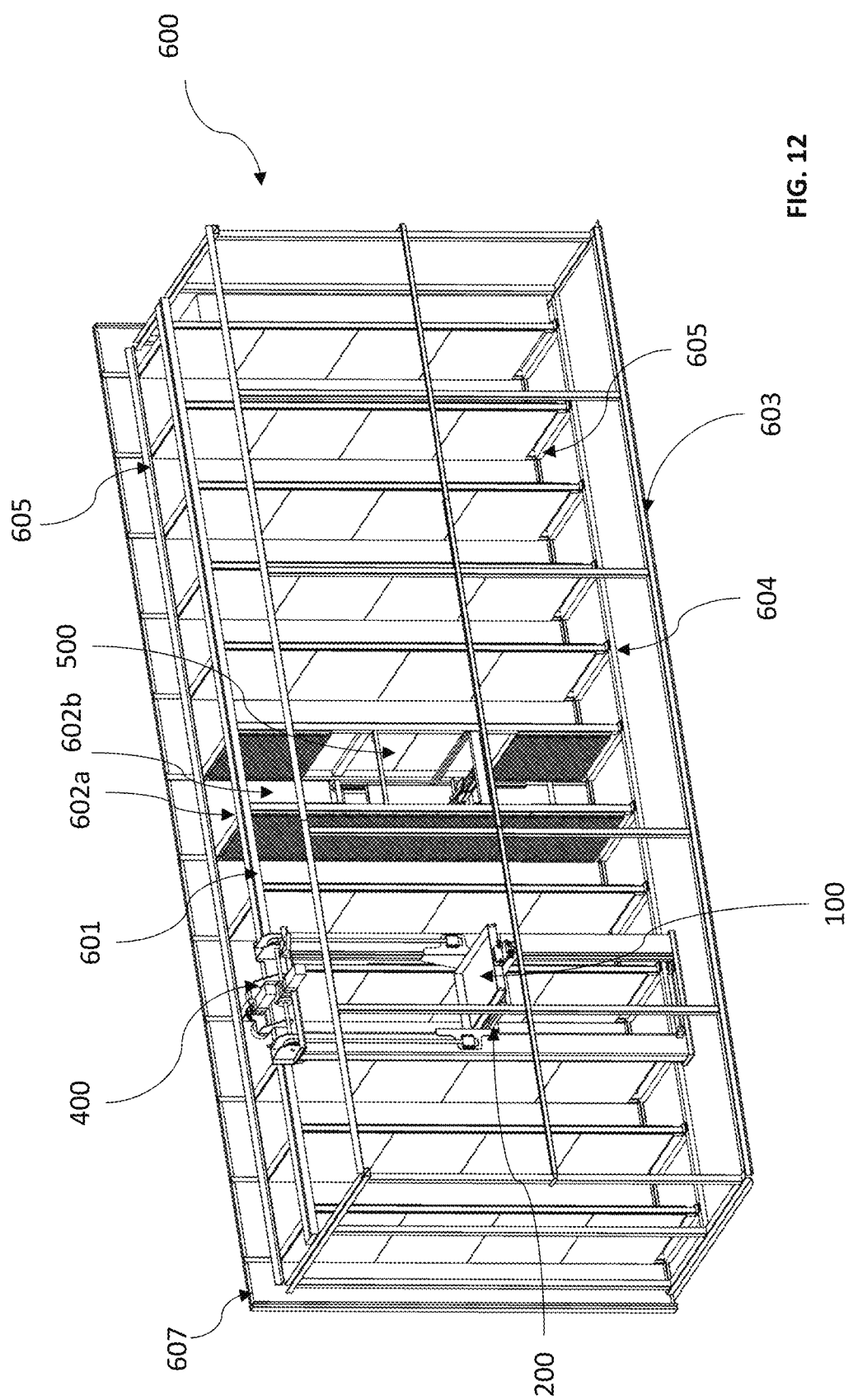

FIG. 12 is an illustration of the internal structure 600 of the parcel terminal. The figure shows the mast top rail 601, and mast bottom rail 604 along which the mast 400 moves. The outer frame 603 is covered with sheet metal panels 607. The figure shows the shelf supports 602a and shelf columns 602b. The loader 200 and a parcel tray 100 are also shown.

Figure 13:
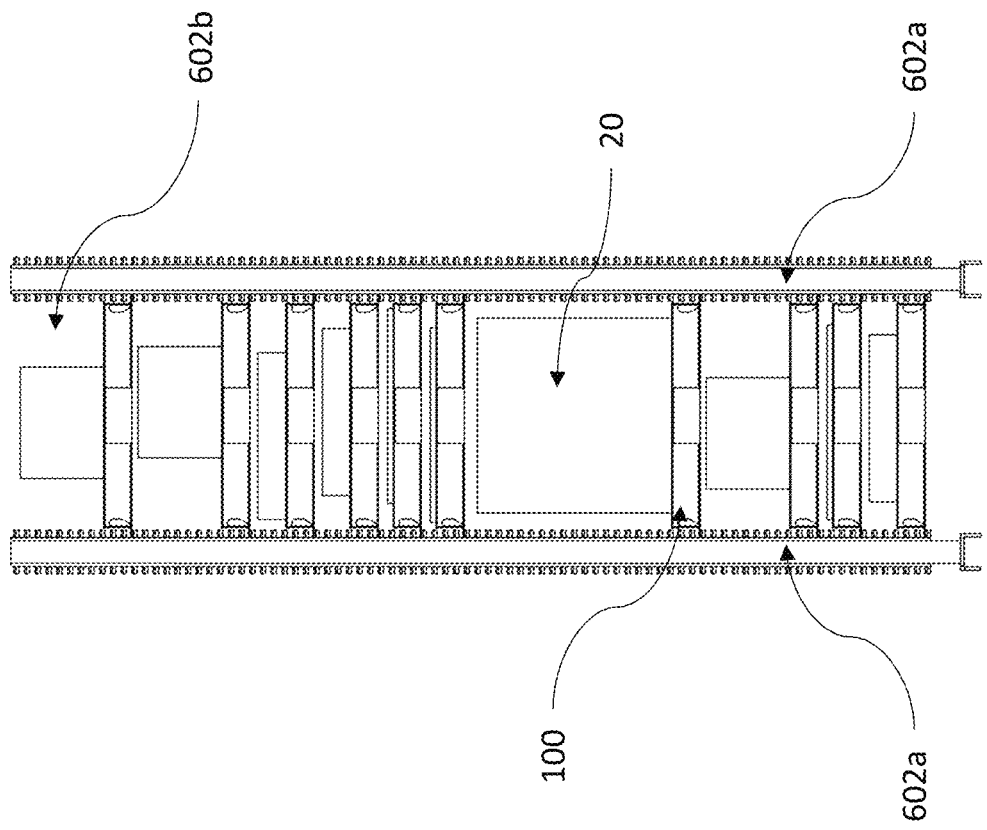

FIG. 13 is an illustration of the shelf structure 602 having a shelf column 602b between two shelf supports 602a.

Figure 14:
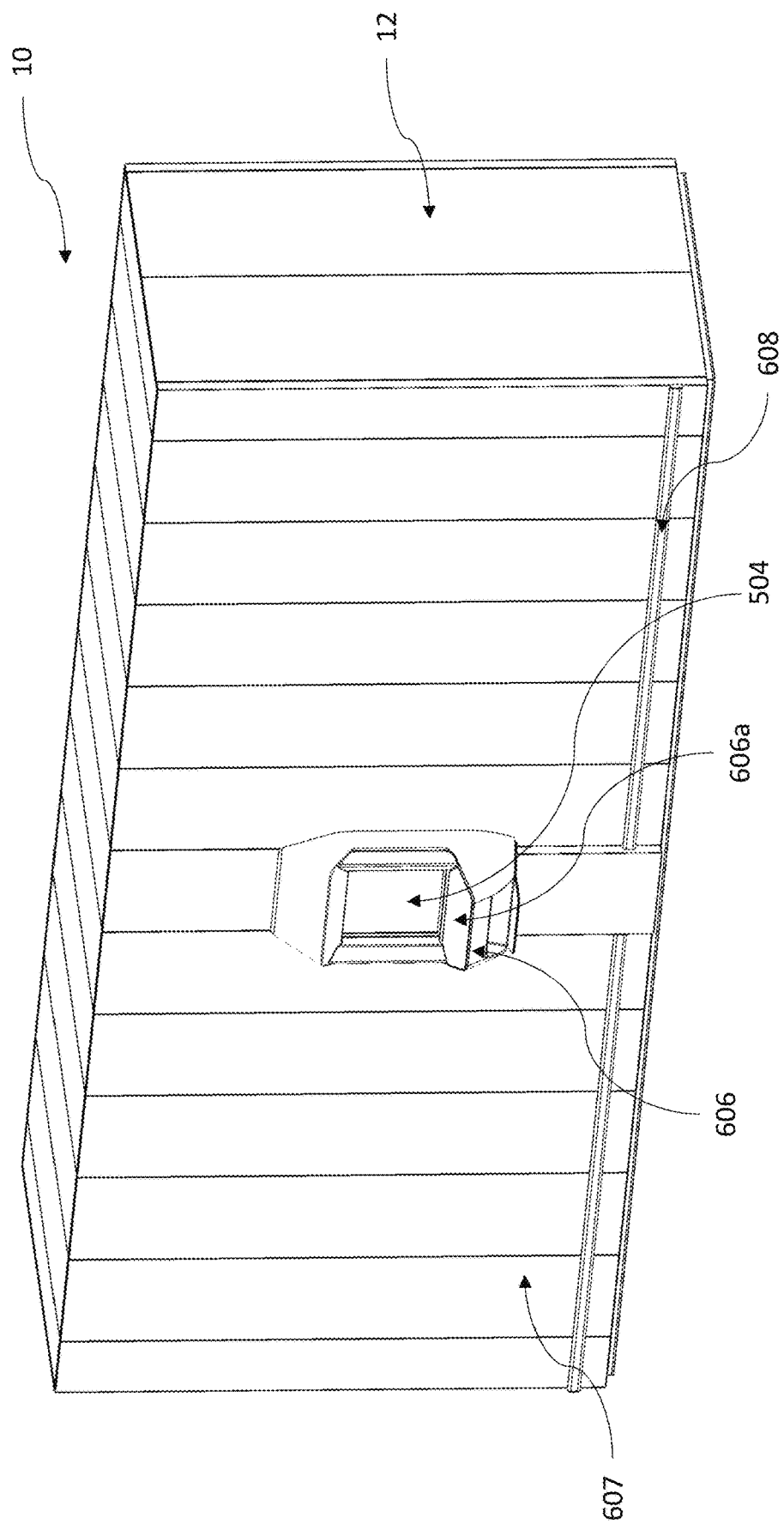

FIG. 14 is an outside view of the parcel terminal having an outer shell 12 and external console 606 preferably on a long end of the terminal. The external console locates such that it provides access to the internal console to retrieve or deposit a parcel when the console sliding door 504 is open. The console sliding door 504 is shown in closed position.

Figure 15:
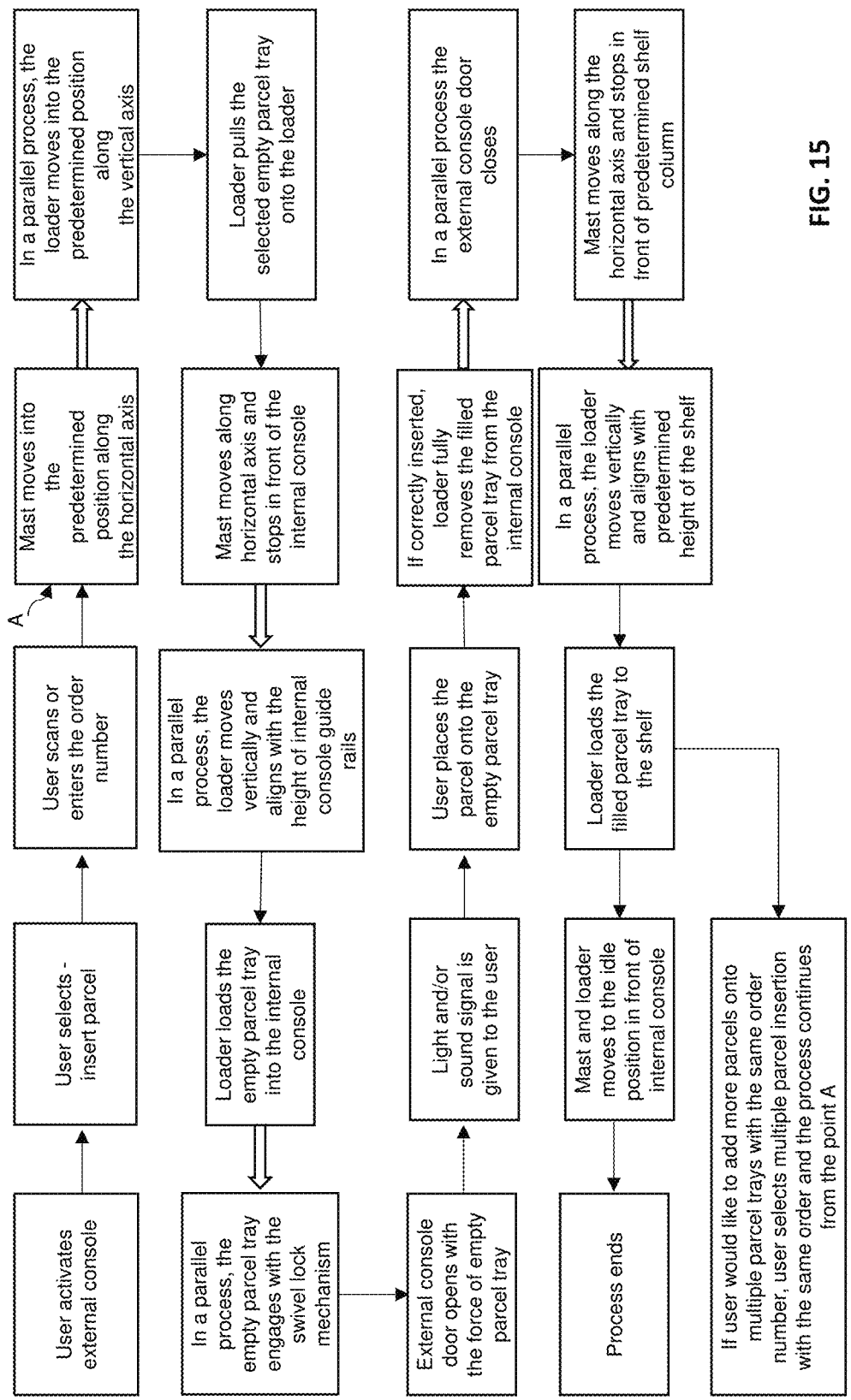
Figure 16:
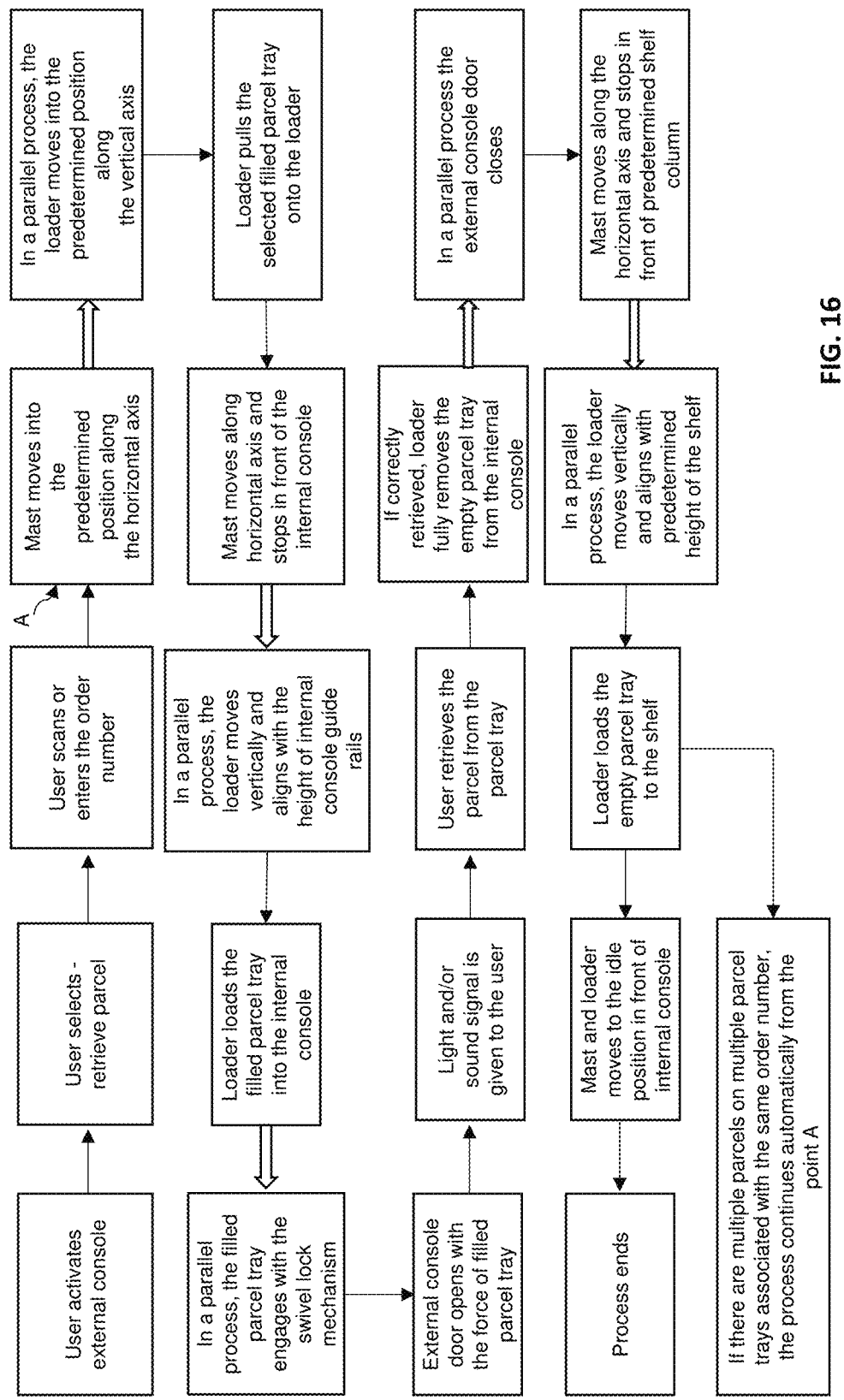

FIGS. 15-16 illustrate flow chart of operations of the terminal.

Figure 17:
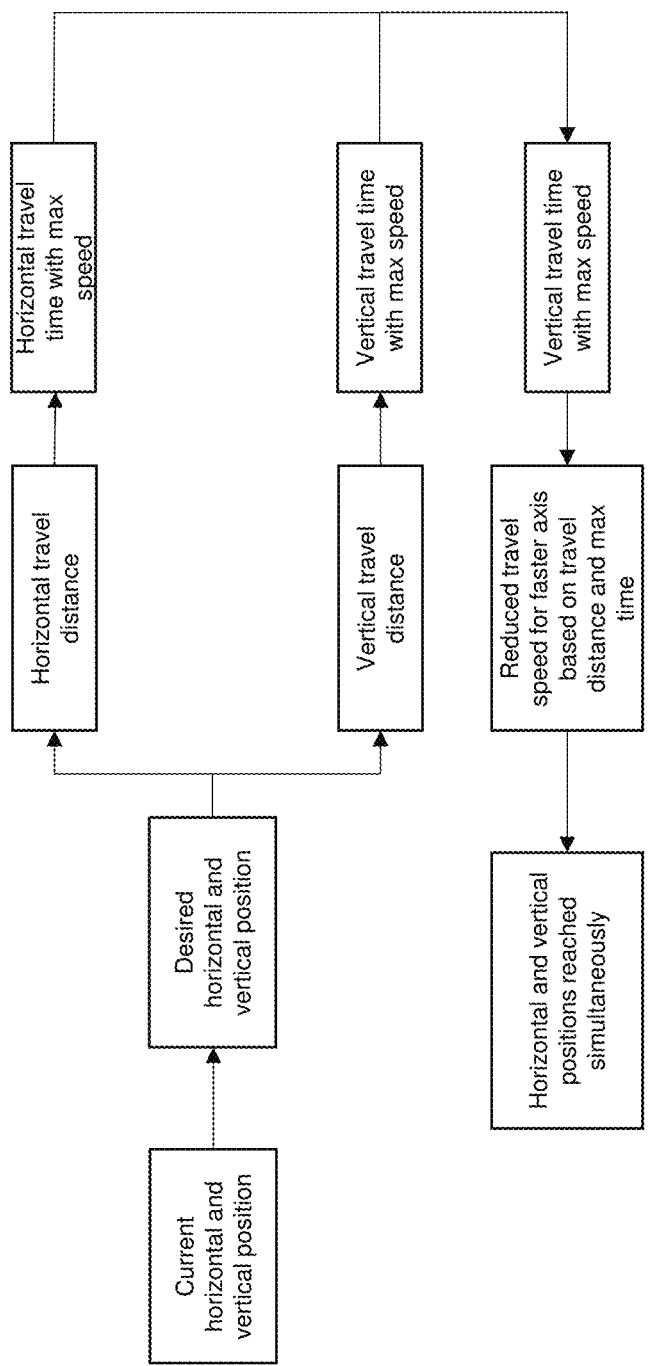

FIG. 17 illustrates a flow chart of mast and loader synchronization.

DETAILED DESCRIPTION OF THE INVENTION

An automated indoor self-service parcel terminal for the storage and handover of pre-ordered items is disclosed here. The automated parcel terminal 10 according to this invention comprises an outer shell 12, an external console 606, an internal console 500, a mast 400, a loader 200, and an internal structure 600. The internal structure comprises a multitude of vertical shelf supports for storing items of different sizes on parcel trays inserted in between of two shelf supports 602a. For the clarity of the description the area in between any two adjacent shelf supports form a shelf column 602b and the trays can be stored in any shelf column. Detailed description is provided below with reference to the appended drawings.

Parcel Tray

The automated parcel terminal 10 uses parcel trays 100 to store different sized goods (parcels) 20 and to move them inside the terminal. A schematic illustration of a tray is shown in FIG. 1. The use of trays allows to store goods in various sizes and ambiguous shapes without imposing strict requirements on their packaging. As is shown in FIG. 1, the parcel tray comprises a tray base 101 and a metal plate (preferably steel plate) 102 on one end. The steel plate is an attachment point for the electromagnet 301 that is used to move the parcel tray onto and off the loader, perpendicularly to the drive path of the mast.

The parcel tray base 101 preferably has chamfered corners and tapered sides to guide the parcel tray in between of two shelf support columns or to the loader. The tray base can be made of different materials including but not limited to steel, stainless steel, different thermoplastics and composites. According to certain embodiments the parcel tray does not have the steel plate 102 when other than electromagnet is used as means of attachment. According to certain embodiments the attachment means not requiring the steel plate may be suction cups. According to certain embodiment the material of the tray is easily magnetizable and the steel plate is not necessary in such case.

Loader

Figure 2:
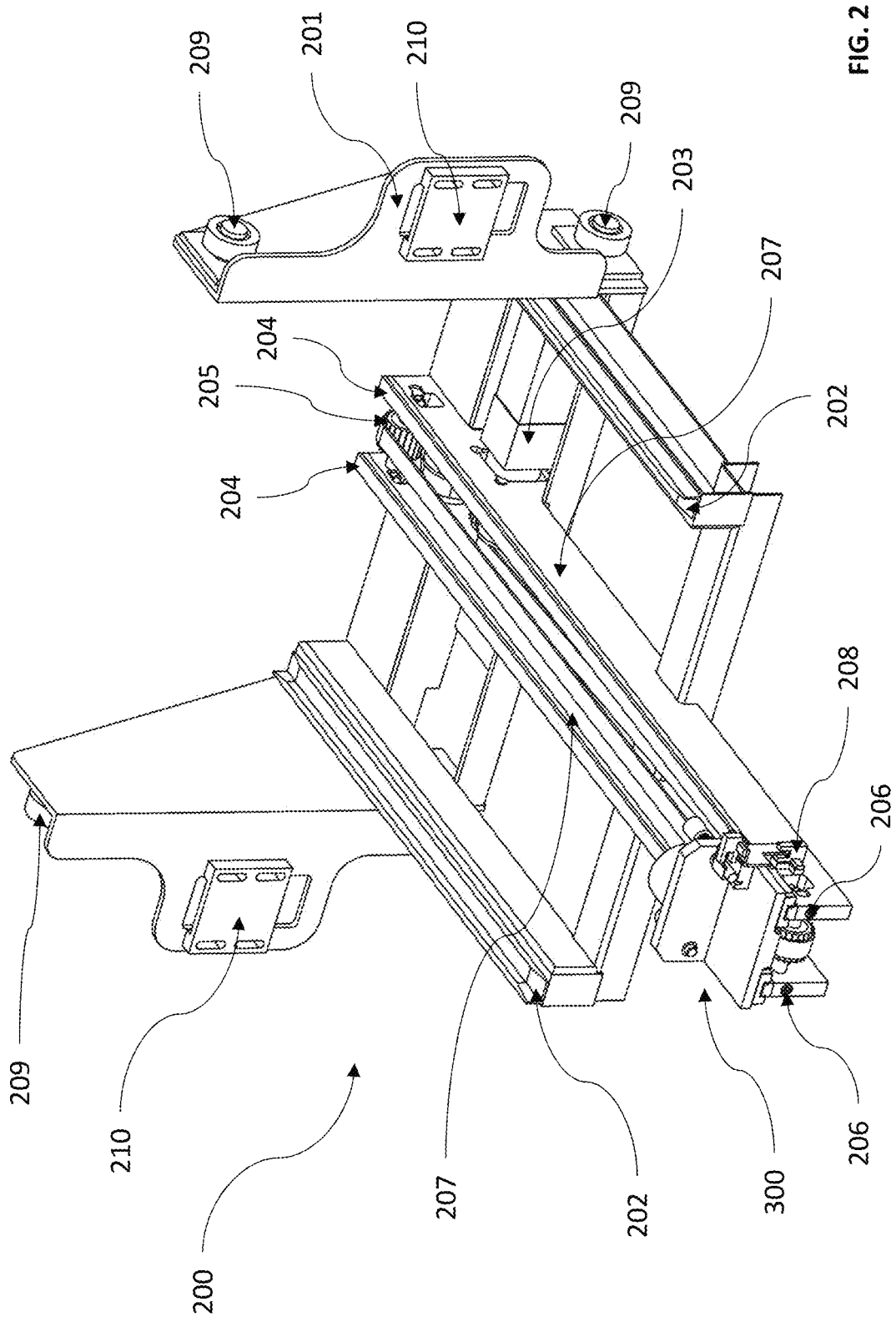
FIG. 2 is an illustration of the loader 200. The figure shows a U-shaped main frame 201 of the loader. Two guiderails 202 are mounted within the main frame at such distances from each other that the guiderails can support a tray when inserted onto the loader. In between and parallel to the guiderails 202 is mounted a linear guiderail system 204 which is formed of two guiderails. In between the two guiderails of the linear guiderail system 204 runs a drive belt system 205 along which a magnetic head 300 is moving. The guiderail system 204 extends at one end beyond the mainframe of the loader. The figure also shows the electric motor 203 attached to the U-shaped frame, and adjustable plates 210 attached on the vertical portions of the U-shaped frame. Adjustment screws 206 and rollers 209 are shown also.

FIG. 2 illustrates the loader. The loader 200 has a substantially U-shaped main frame 201, which acts as a connection point for all other parts of the loader. Placed within the substantially U-shaped main frame is a pair of guiderails 202 mounted at such distance from each other that they guide the parcel tray 100 when it moves along the loader on top of the guiderails. The length of the guiderails 202 preferably equals to deepness of the main frame. The guiderails are mounted onto the main frame and can be easily replaced, if necessary. The material of the guiderails is highly durable and strong, such as polyoxymethylene i.e. polyacetal or similar, which ensures their long life and the capacity to carry maximum weight parcel trays. Guiderails 202 have preferably tapered ends to guide the parcel tray 100 onto the loader while it is being pulled from a shelf column.

Figure 3:
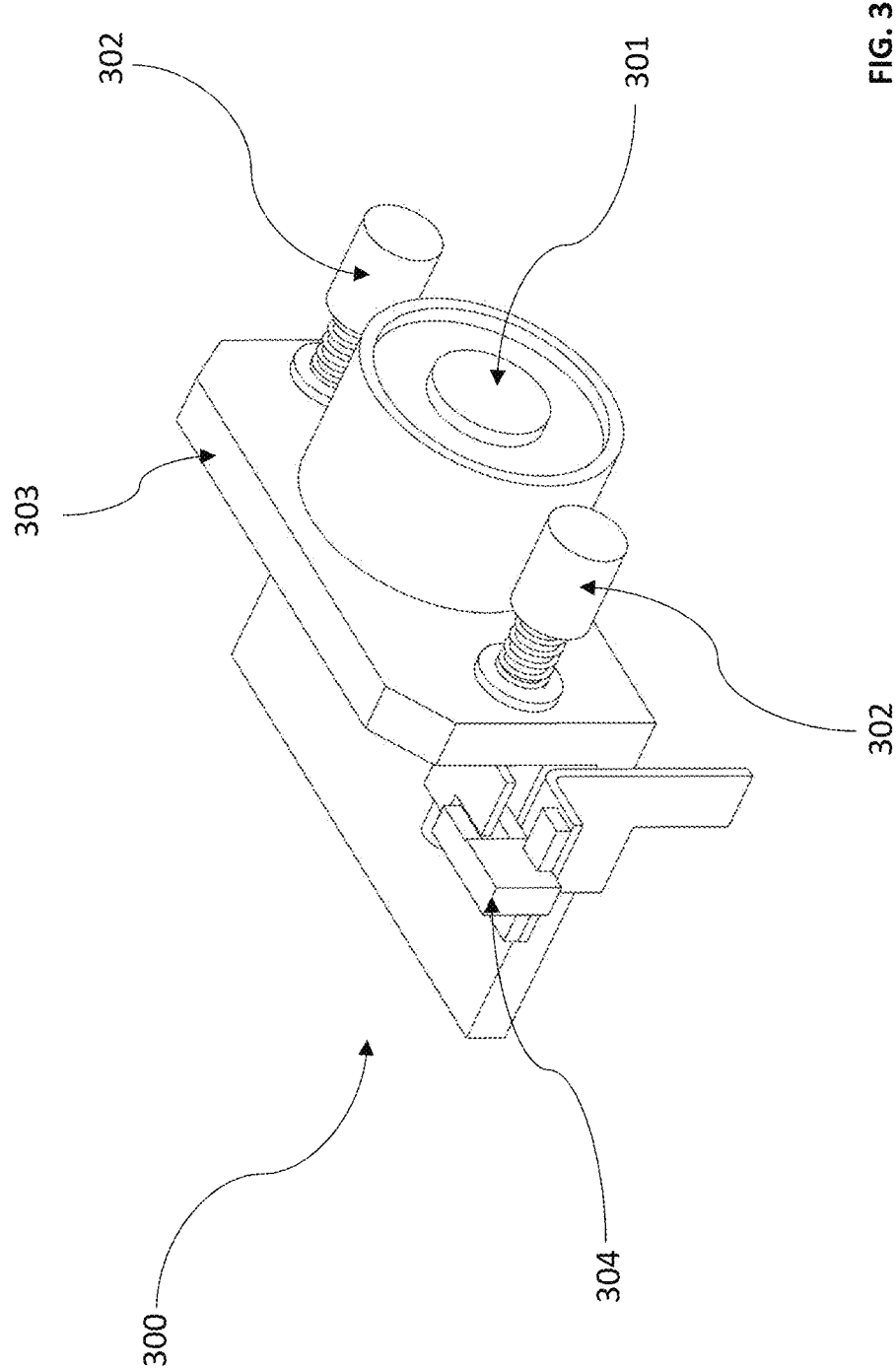
FIG. 3 is an illustration of the magnetic head 300. The magnetic head has an electromagnet 301, two pushers 302 on both sides of the electromagnet, a housing 303 onto which the electromagnet and the pushers are attached. The magnetic head has additionally at least one sensor 304.

In between of and parallel to the guiderails 202, there is a linear guiderail system 204 mounted for a magnetic head 300 to move on. According to a preferred embodiment the guiderail system extends beyond the main frame of the loader at least at one end. The magnetic head is illustrated in detail in FIG. 3. The magnetic head has an electromagnet 301 aligned with the linear guiderail system and pointing toward the shelf columns on one side of the parcel terminal. In an alternative embodiment the magnetic head is double-sided, which would enable the loader to pick up parcel trays from both sides of the loader. According to a preferred embodiment, the loader is capable of moving parcel trays to and from the parcel terminal's internal console (500 in FIG. 12) and to and from the shelf columns 602b (area between two shelf supports 602a in FIG. 12). As is shown in FIG. 2, the magnetic head is mounted onto linear guiderail system 204. In addition to the electromagnet, the magnetic head comprises at least one pusher, preferably two pushers 302, and a housing 303 that joins the components together. The electromagnet can move in relation to the housing, which makes it possible to compensate for any potential parcel tray loading or loading position inaccuracies. The electromagnet hangs over from the housing to the extent that is necessary to reach across the edge of the loader to grab parcel trays placed in the shelf columns. The pushers are preferably located on opposite sides of electromagnet. The pushers are connected to a sensor 304 that provides a signal to define whether the parcel tray is attached to the electromagnet. The pushers also help to push the parcel tray away from the electromagnet if any residual magnetism should occur, to ensure that the parcel tray is not attached to the magnetic head when the mast or mast lift starts moving.

The magnetic head is moved via an electric motor 203 and drive belt system 205 shown in FIG. 2. The drive belt has easy access adjustment screws 206 on both ends of the loader that allow to change the angle of the endmost rollers of the drive belt system to ensure that the movement of the drive belt is as linear as possible and also to adjust the belt's tension. The drive belt system with rollers is placed between two plates 207 that stretch along the entire length (depth) of the loader. There is a home sensor 208 for the magnetic head at one end of the loader.

Figure 7:
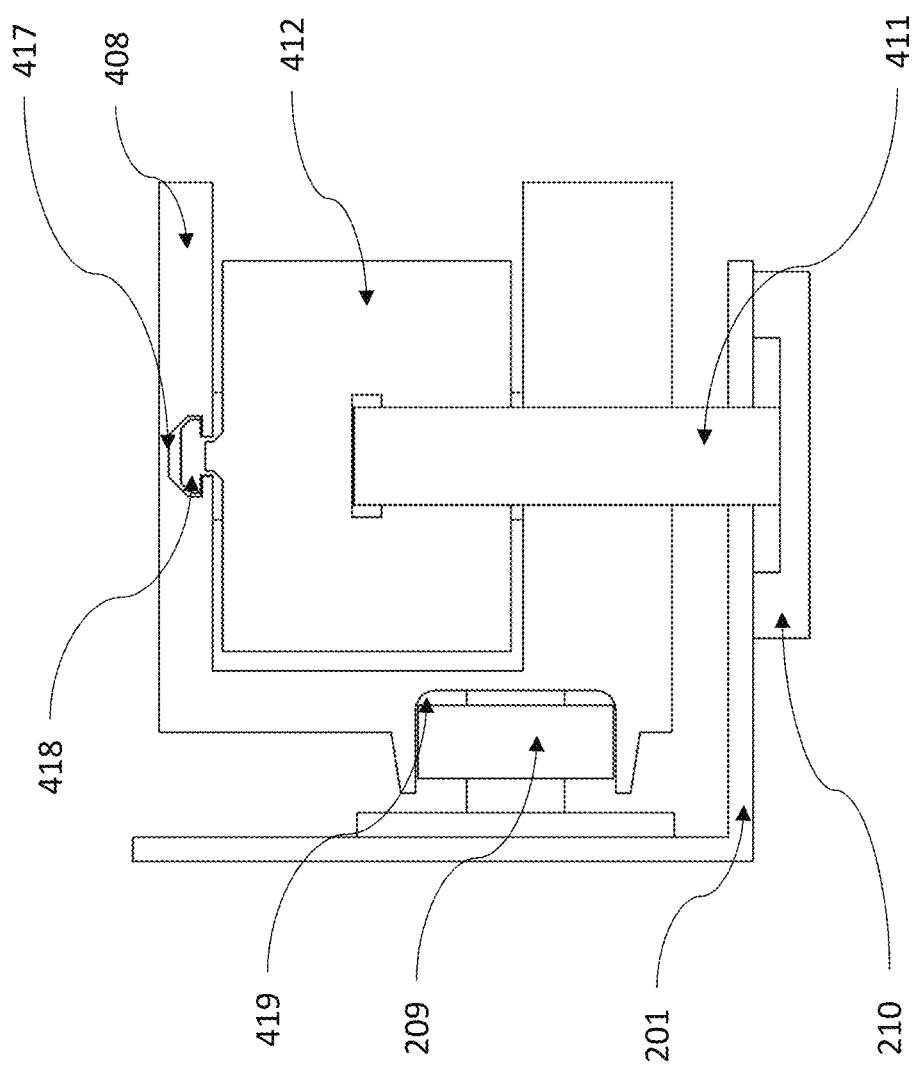
FIG. 7 is an illustration of a horizontal cross section of a hollow and partially open, here U-shaped beam 408, showing a counterweight 412 within the inner space of the U-shaped beam. There is a groove 417 running vertically along one inner wall of the beam along which a counterweight slider 418 slides. On the outer wall of the U-shaped beam opposite to the opening of the U-shape, there is a vertical guiding groove 419 for the roller 209 of the loader to fit in and guide vertical movement of the loader. The figure also shows the drive belt 411 of the loader and adjustable plate 210 through which the drive belt runs.

The loader is positioned relative to the mast via rollers 209 located at both vertical portions of the loader's main frame. The rollers are mounted onto the main frame 201 such a manner that they are easily replaceable. These rollers are preferably covered with polyurethane layer to ensure longevity and silent movement along the mast beams. The rollers position the loader on the mast along the moving direction of the magnetic head and along the drive direction of the mast. FIG. 7 shows the role of the rollers 209 in attaching the loader to the beams 408 of the mast. There is a vertical guiding groove 419 on the outer wall of the beam for the roller 209 fit in and guide the vertical movement of the loader. To compensate for the manufacturing tolerances of the loader and to ensure that the guiderails 202 of the loader always form a horizontal plane parallel to the corresponding shelf columns, two vertically adjustable plates 210 are used to attach the loader to drive belts on the lift assembly (FIG. 7 shows the connections between the adjustable plates and the drive belts).

Mast

Figure 4:
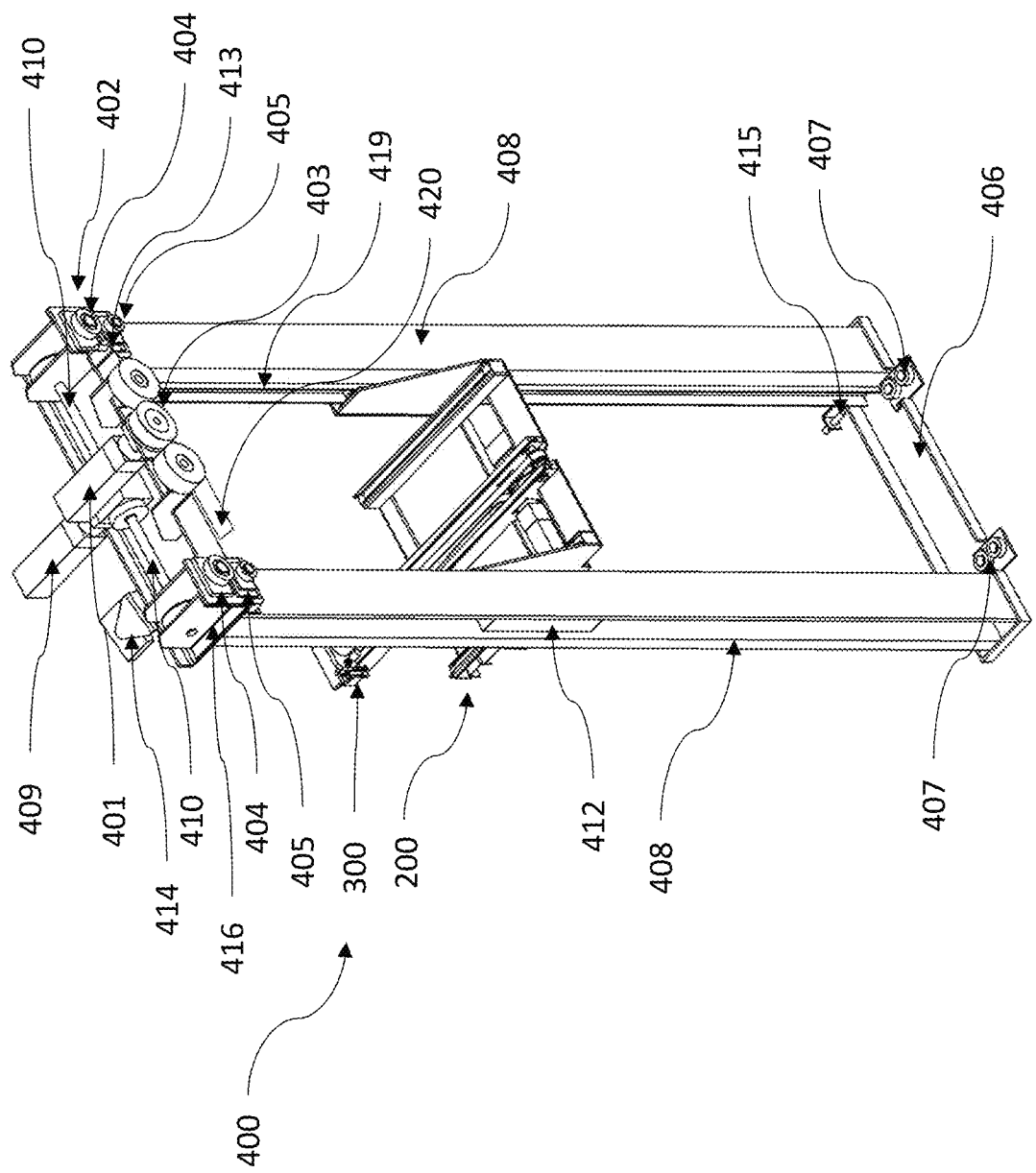
FIG. 4 is an illustration of the mast. The mast 400 comprises of two vertical beams 408 that are supported from their lower ends by a bottom plate 406 and from their upper ends by a top plate 416. The loader 200 is attached in between the beams. On top of the top plate there is a mast drive motor 401 that moves with the mast. The motor is in connection with a drive belt system 403. On top of the upper plate there is a carriage 402 comprising at an upper support roller 404 and a lower support roller 405 at each end of the carriage. The beams 408 are hollow and partially open on one side and have a groove 417 (shown in FIG. 7) on their inner surface in which the counterweights 412 are moving.

FIG. 4 illustrates the mast. The mast comprises two vertical beams 408, a bottom plate 406 that supports the beams from their lower end and a top plate 416. The mast 400 is driven along the mast top rail 601 (shown in FIG. 12) and on a mast bottom rail 604 along an aisle between the shelf supports 602a (shown in FIG. 12) and outer frame of the parcel terminal 603 (FIG. 12) or alternatively between two rows of shelf supports in an alternative embodiment. Power transmission is achieved through a mast's drive belt 420 running along the mast top rail 601, fixed to the rail at its both ends. At one end of the rail there is a drive belt tensioning system. A mast drive motor 401 is located on top of the mast top structure and it moves with the mast. The upper section of the mast comprises a carriage 402, through which the mast is connected to the top rail 601 and to the mast's drive belt 420.

The carriage 402 holds the rollers 403 of the drive belt system through which power is transmitted to the drive belt. The drive system uses an omega type belt routing to ensure maximum number of belt teeth connecting to the drive wheel and to hold the belt as close to the mast rail as possible. The system preferably has two omega drive idlers that are adjustable in two axes to ensure the drive belt runs as linear as possible along the entire length of the machine.

Figure 5:
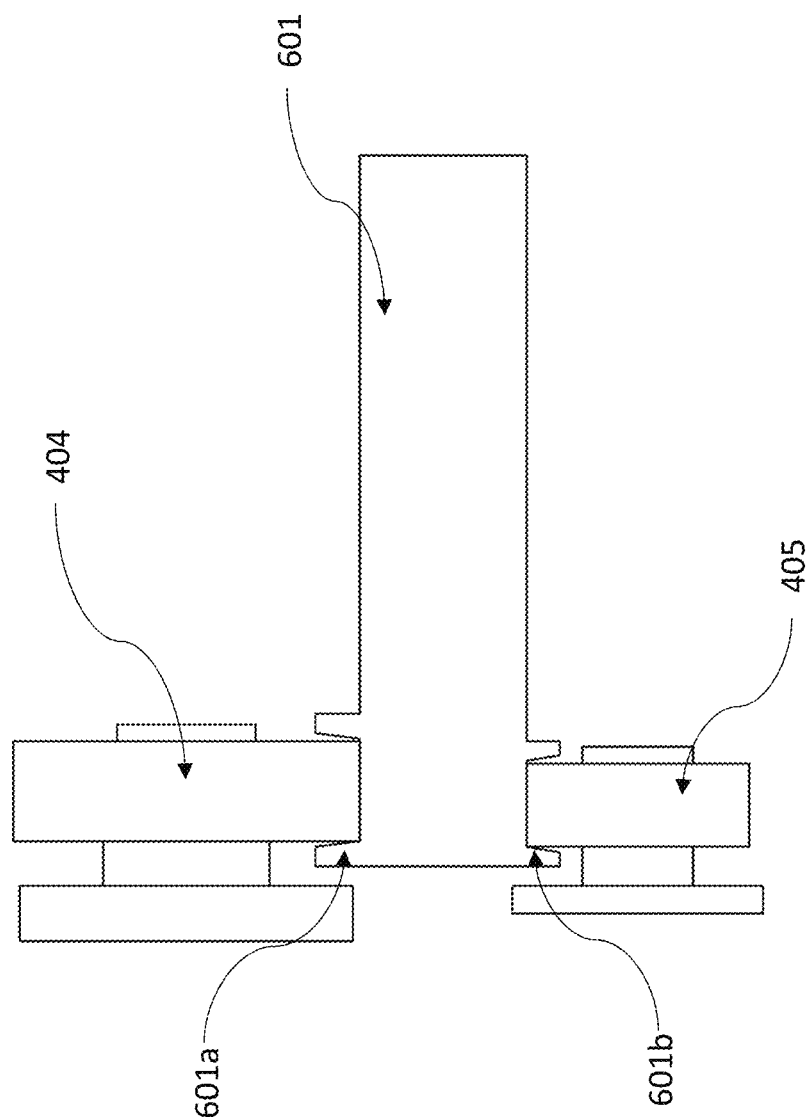
FIG. 5 shows a vertical cross section of the mast top rail 601 and the upper 404 and lower 405 support rollers of the carriage. The cross section is taken perpendicularly to the moving direction of the mast. The support rollers fit snugly into the upper and lower mast rail contour (601a, 601b).

The carriage also holds upper support rollers 404 and lower support rollers 405, through which the mast is connected to the top rail 601 (connection is illustrated in FIG. 5). The rollers are driven in two contours 601a and 601b of the mast top rail. The contours may be substantially V-shaped, U-shaped, or of rectangularly shaped. Upper support rollers support the weight of the mast assembly and define the position of the mast. The position of lower support rollers is adjustable in vertical direction to compensate for manufacturing tolerances. These rollers ensure that no tilting of the mast out of the vertical plane takes place when the mast is being accelerated or deaccelerated. Both pairs of rollers are preferably covered with polyurethane layer to ensure longevity and silent movement along the machine. The mast may have different number of rollers depending on the loads of the given mast needs to carry. The rollers are mounted to the carriage in a way that they are easily replaceable.

Figure 6:
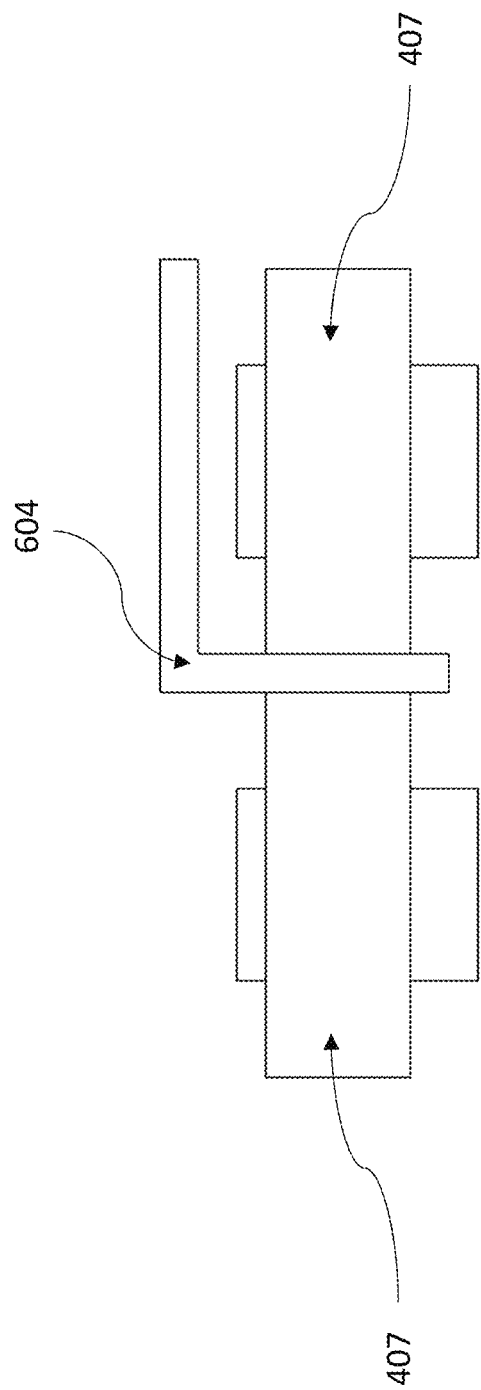
FIG. 6 shows a vertical cross section of the mast bottom rail 604 and the bottom guide rollers 407. The cross section is taken perpendicularly to the moving direction of the mast. The cross section of the rail has an L-shape such that the vertical prong of the L is in between the rollers.

As shown in FIGS. 4 and 6, the bottom section of the mast comprises a bottom plate 406 and preferably two pairs of bottom guide rollers 407. The position of bottom guide rollers is adjustable perpendicular to the mast's driving direction to ensure that the mast can be positioned parallel to the shelf columns. FIG. 6 shows the bottom rail having an L-shaped cross section and the vertical prong of the L-shaped bottom rail fits in between a pair of rollers. The rollers are driven along the mast bottom rail 604 and they ensure that no back and forth tilting of the mast out of the vertical plane takes place while loading or unloading parcel trays.

Referring to FIGS. 4, 5, and 7, the mast has a lift assembly configured to move the loader 200 vertically along the mast. The lift assembly comprises two hollow, partially open sided beams 408 that include preferably a U-shaped (although other shapes, such as V-shape, flat U-shape are also possible) guiderails 419 in inner sides of the beams for the rollers 209 of the loader (see also FIG. 7). (By inner side here it is meant the side of the beam that faces toward the loader.) Lift drive motor 409 is attached to the mast carriage 402 and is preferably located underneath the mast drive motor (FIG. 4). Power transmission for the lift assembly is achieved through drive pulley systems 410 and two open ended drive belts 411 running partially inside the hollow beams 408. One end of each belt is connected to the loader (see FIG. 7) while the other end of each belt is connected to counterweight 412 (FIG. 7). The counterweights are guided along the beams 408 in vertical grooves 417 on an inner surface of each hollow beam to ensure silent movement while the mast is being accelerated or deaccelerated. FIG. 7 is an illustration of horizontal cross section of a beam 408 having a flat U-shape. The figure shows the counterweight 412 inside the hollow beam, a vertical groove 417 on the inner surface of the hollow beam 408 wherein a slider 418 of the counter weight fits in, and the roller 209 in a guide rail on the inner side of the beam. (For clarification inner side of the beam means here the side of the beams that faces toward the loader while the outer side means the sides that face away from the loader.) The figure shows the main frame 201 of the loader as well as an adjustable plate 210 of the main frame of the loader. The figure illustrates the connections between the beam, the loader and the drive belt and counterweight of the lift assembly.

A homing sensor for the mast 413 is located at one end of the carriage while a camera 414 to observe the loader in operation is located at the other end. Homing sensor for loader's vertical movement is located at the bottom part of the mast 415.

Internal Console

Figure 8:
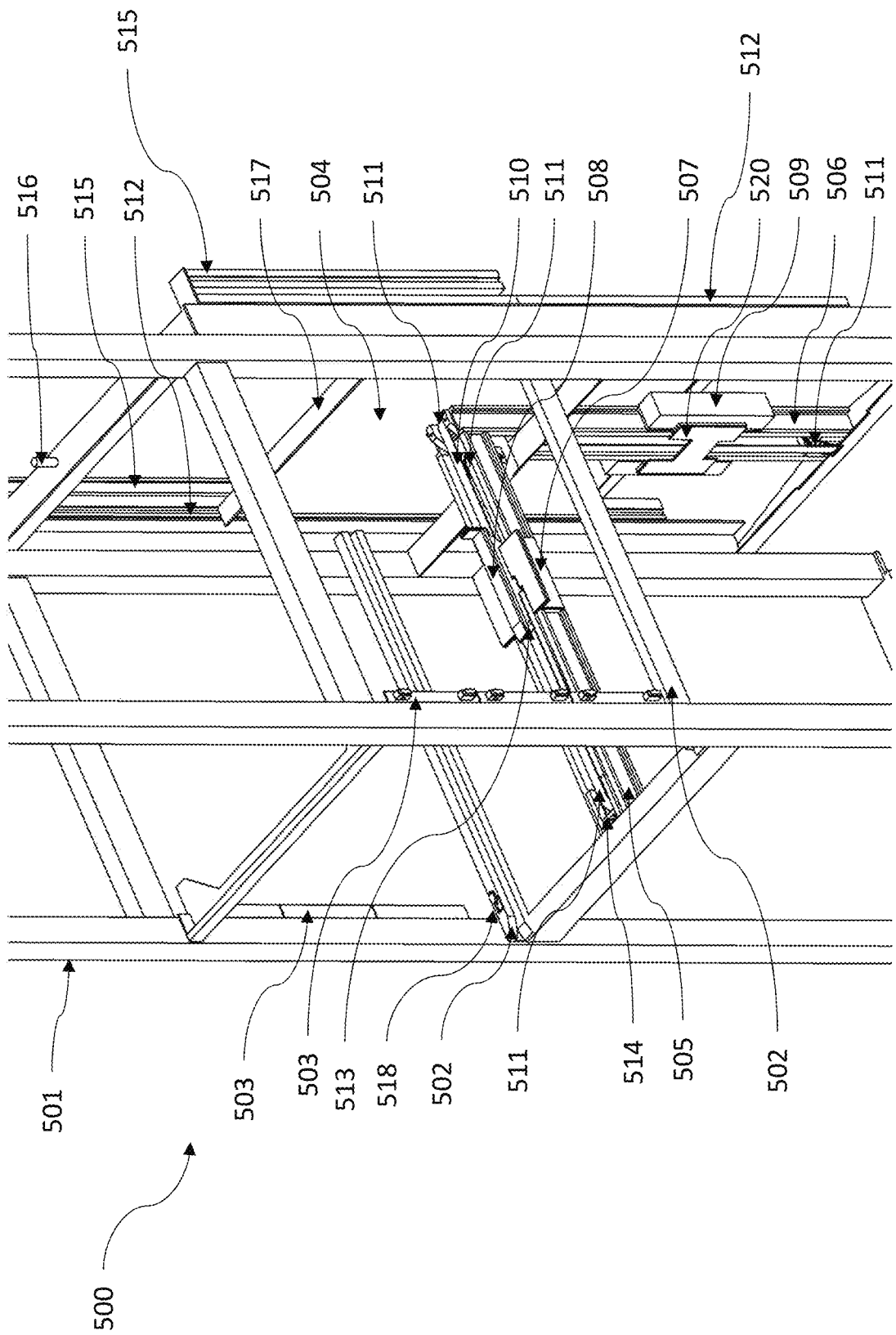
FIG. 8 is an illustration of the internal console 500 of the parcel terminal with the mechanism to open and close the sliding console door 504 from one perspective. The figure shows the support structure 501, guiderails 502, measurement curtains 503, the sliding console door 504, horizontal slides 505, vertical slides 506, the carriage 507, the swivel lock mechanism 508, the counterweight 509, L-shaped drive belt loop 510, drive belt pullies 511, sliding door guiderails 512, locking teeth 513, locking pin 514, light curtains 515, a door home sensor 516, and a counter 517 (which is also the upper edge of the sliding console door 504).
Figure 9:
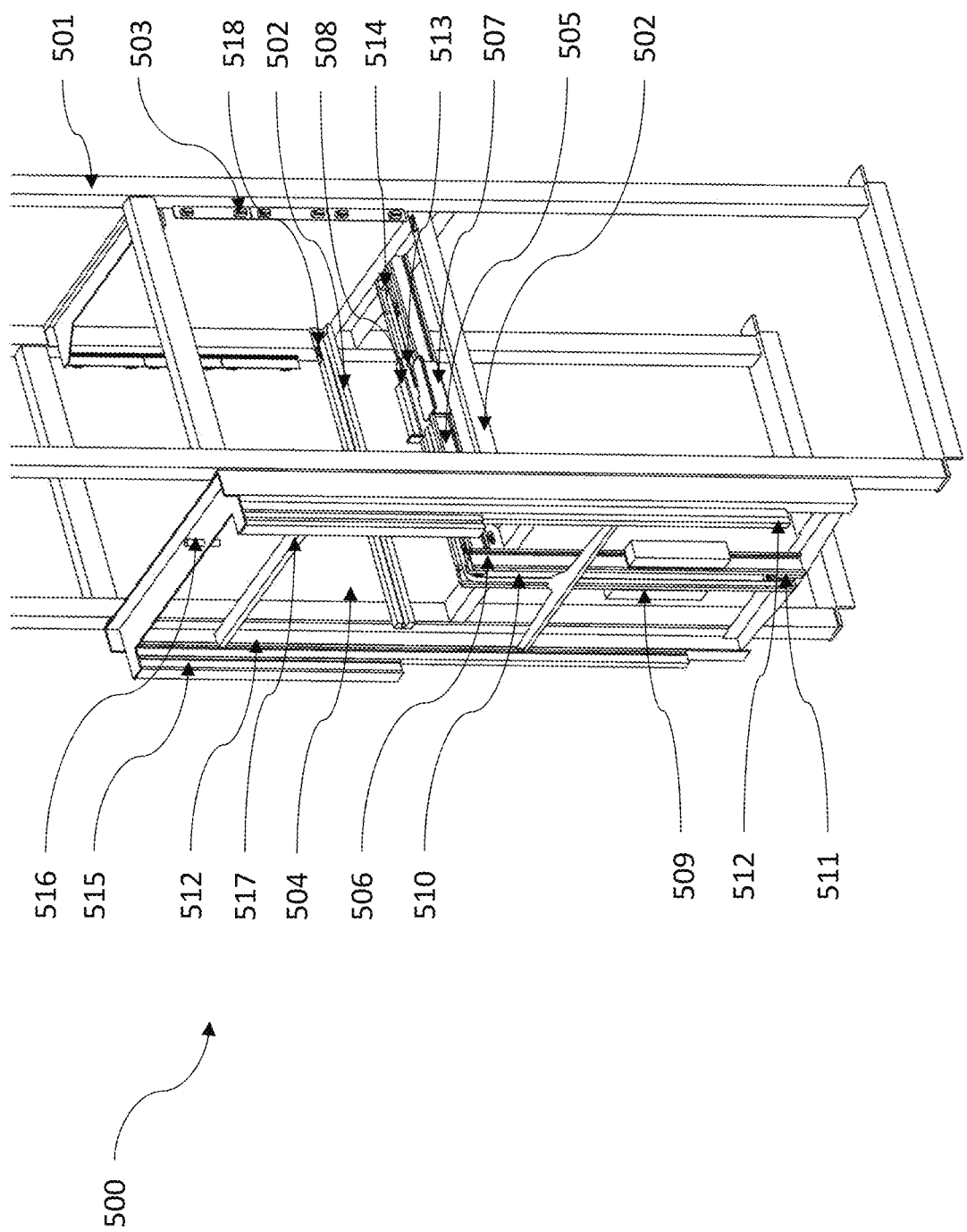
FIG. 9 is an illustration of the internal console of the parcel terminal with the mechanism to open and close the sliding console door 504 from another perspective. The figure shows the support structure 501, guiderails 502, measurement curtains 503, the sliding console door 504, horizontal slides 505, vertical slides 506, the carriage 507, the swivel lock mechanism 508, the counterweight 509, L-shaped drive belt loop 510, drive belt pullies 511, sliding door guiderails 512, locking teeth 513, locking pin 514, light curtains 515, a door home sensor 516, and a counter 517 (which is also the upper edge of the sliding console door 504).

Referring now to FIGS. 8 and 9, the internal console 500 of the parcel terminal enables placement and retrieval of parcels. The internal console comprises a support structure 501 to which a pair of horizontal parcel tray guiderails 502 are attached. The guiderails are easily replaceable and made of highly durable material such as polyoxymethylene i.e. polyacetal or similar, which ensures their long life and the capacity to carry maximum weight parcel trays. According to one embodiment, next to the guiderails preferably on the support structure 501 are measurement curtains 503 to register the height of the parcel when the magnetic head 300 pulls the parcel tray holding a parcel out of the internal console and onto the loader 200. The height measurement information is registered by the computerized system of the terminal and enable the automated terminal to distribute the received parcels inside the terminal in most optimal manner.

Figure 10:
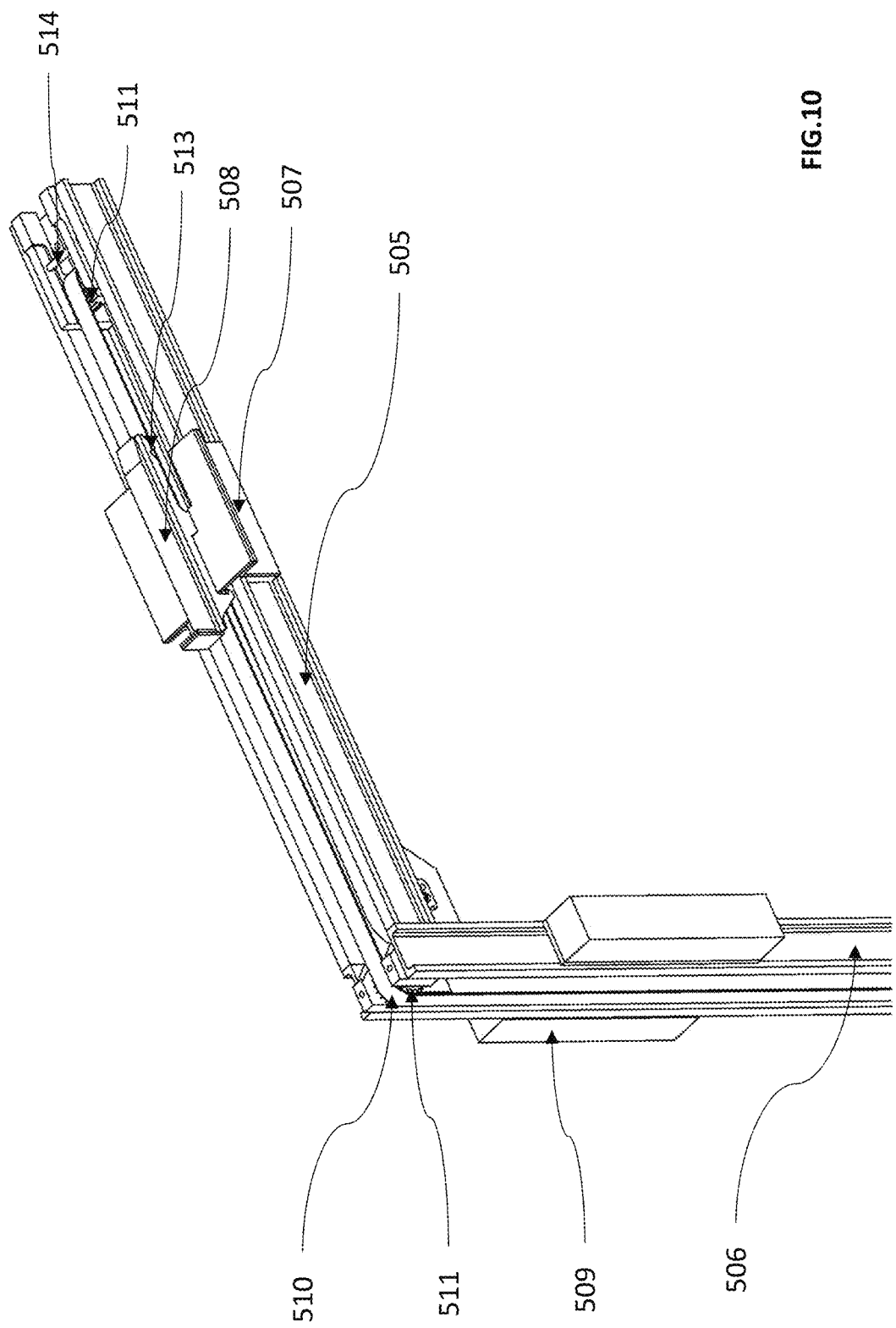
FIG. 10 is a detailed illustration of the mechanism to operate the sliding console door 504. The system includes horizontal slides 505 and vertical slides 506 that form an L-shaped structure along which an L-shaped drive belt loop 510 is arranged. The carriage 507 moves along the horizontal slides. The figure shows the swivel lock mechanism 508 (shown in more details in FIG. 11). The counterweights 509 controlling the movement of the swivel lock mechanism move along the vertical slides.

The mechanism to operate the console sliding door 504 is located below the guiderails in the internal console (FIG. 8, 9). FIG. 10 illustrates the construction of the mechanism. The mechanism includes horizontal slides 505 and vertical slides 506. A carriage 507 which supports a swivel lock mechanism 508 is attached onto the horizontal slides. A counterweight 509 is attached to the vertical slides. Operation of the swivel lock mechanism is shown in detail in FIG. 11. An L-shaped drive belt loop 510 connects the swivel lock mechanism, the counterweight and the console sliding door 504 into a single system. The L-shape of the drive belt loop is formed by drive belt pullies 511 that locate at the ends of the vertical and horizontal slides. The pullies are adjustable to ensure that the belt runs as straight as possible between the vertical and horizontal slides. The sliding door 504 connects to the front side of the drive belt loop. In FIG. 9a lower edge of the sliding door is attached to the front side of the L-shaped drive belt loop). The sliding door 504 is supported on its sides by guiderails 512. The counterweight 509 is connected to the back side of the belt loop (FIG. 8). According to one embodiment the connection is made by a bracket 520 as is shown in FIG. 8. The drive belt 510 loops around the pulleys 511. The door moves up and down with the front-to-back movement of the swivel lock mechanism such that when the front side of the belt loop moves up when the swivel lock mechanism moves backward (away from the sliding door), the back side of belt loop along with the counter weights moves downward and the sliding door 504 moves upward to a closed position closing the entrance to the internal console. When the swivel lock mechanism moves forward the front side of the drive belt loop moves down, the counterweights move upward, and the door moves downward to an open position to open the entrance to the inner console. The size of the counterweight is chosen such that gravitational pull on the counterweight exceeds the gravitational pull on the sliding door and internal forces in the mechanical system. At the same time the force is low enough to avoid personal injury while placing a hand in the movement path of the sliding door while the door moves up (i.e. closes).

Figure 11:
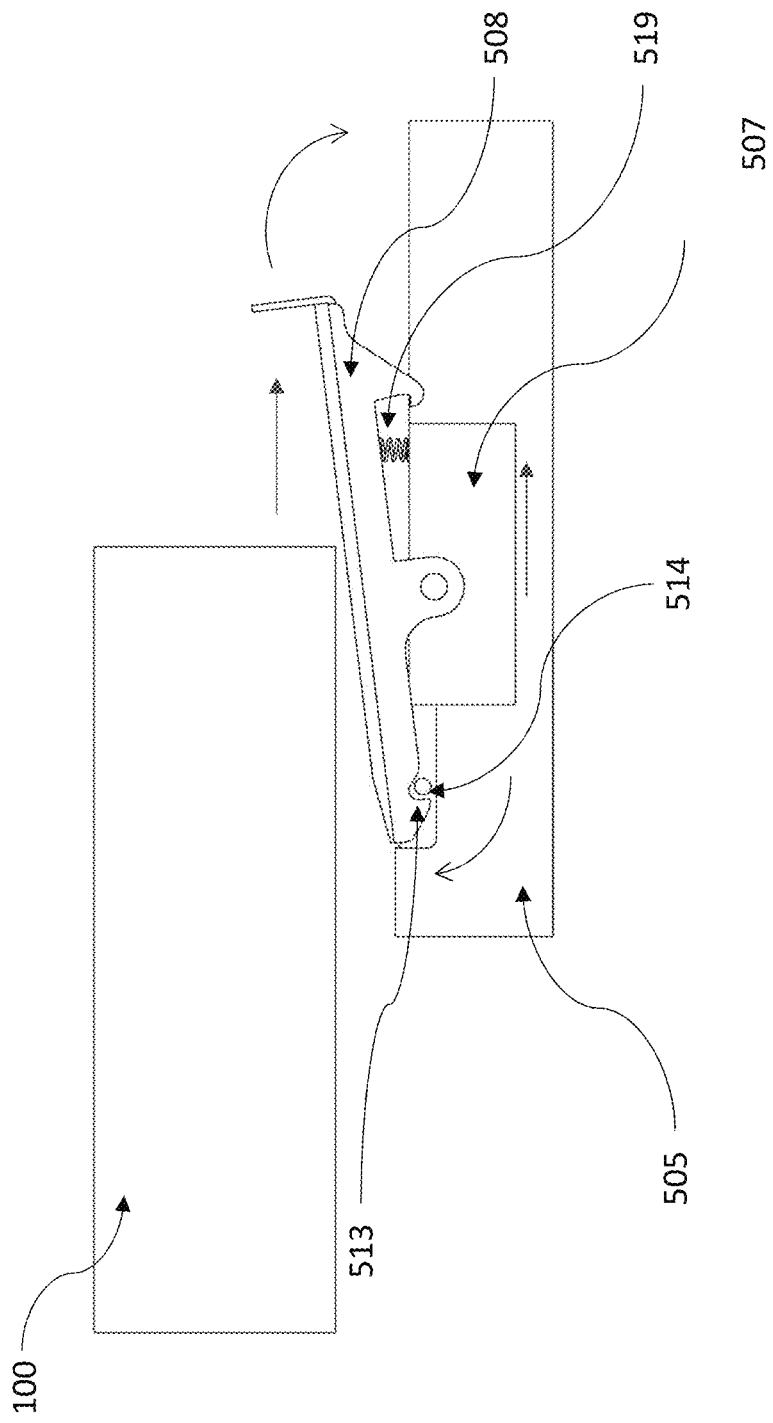
FIG. 11 is an illustration of swivel lock mechanism of the internal console. The figure shows the parcel tray 100, horizontal slides 505, the carriage 507, the swivel lock mechanism 508, locking teeth 513, locking pin 514, and spring mechanism 519.

Movement of the swivel lock mechanism is arranged such that it is controlled by insertion and removal of the parcel tray into the internal console. Operation of the swivel lock mechanism is illustrated in FIG. 11. When the parcel tray is not engaged with the swivel lock mechanism, the force from the counterweight always moves the swivel lock mechanism to the end (away from the sliding door) of the horizontal slides where the locking teeth 513 engage with the locking pin 514 due to the pressure from a spring mechanism 519 (FIG. 11) The profile of the locking teeth is chosen such that it is impossible to open the sliding door from outside while the swivel lock mechanism is engaged with the locking pin.

When the loader's magnetic head pushes the parcel tray into the console guiderails 502, the tray end engages with the swivel lock mechanism which swivels and consequently the locking teeth disengage from the locking pin (see FIG. 11). The carriage 507 holding the swivel lock is pushed to the other end of the horizontal slides (toward the sliding door) while at the same time the sliding door is moved down (open) and the counterweight moves up. In order to ensure safe operation of the sliding door a pair of light curtains (safety curtains) 515 is placed in front of the sliding door. While these light curtains are obstructed the movement of the loader's magnetic head is stopped to ensure that the user/customer cannot place his or her hand between the sliding door and arriving parcel tray. The operational profile of the loader's magnetic head when engaging with the swivel lock is configured in such a manner that the movement of the door is carried out without sudden accelerations and silently as possible. There is a door home sensor 516 at the upmost position of the door to register the locked state of the door and switch off the signal from the light curtains. The sliding door opening mechanism enables to operate the sliding door with the loader's magnetic head/parcel and without a special dedicated motor.

The counter 517 of the internal console on top of the sliding door is made from high surface hardness material such as brushed stainless steel or anodized aluminum to ensure good resistance to scratches that can occur during parcel handling. The counter acts as a supporting surface when inserting or retrieving parcels as parcels can be placed on it and pushed onto the tray.

Optical sensors 518 are placed at the ends of the parcel tray guiderails 502 to detect widthwise oversize parcels. These sensors detect oversize while the parcel is being pulled onto the loader from the internal console. If any oversize is detected, the parcel tray is pushed back into the internal console.

Internal Structure

Referring now to FIG. 12, the internal structure 600 of the terminal consists mainly of shelf supports 602a that form platforms between them to provide support for the parcel trays so parcels can be stored. The shelf supports 602a are joined together by the mast top rail 601, mast bottom rail 604 and multitude of support beams 605. All these components can be manufactured from single items or jointed items. FIG. 13 shows the shelf structure 602 showing the elements in more detailed manner.

The shelf supports form one row inside the parcel terminal and leave an unobstructed section or an aisle for the mast. It may also be noted that in an alternative embodiment of the system, shelf supports can form two rows inside the parcel terminal, leaving an unobstructed middle section (aisle) for the mast. An area between one pair of shelf supports is used for internal console to facilitate insertion and retrieval of parcels. The location of the internal console can be chosen freely along the length of the parcel terminal.

Outer Shell and External Console

FIG. 14 shows an outer view of the parcel terminal and shows the external console 606. The external console serves as an interaction area of the terminal. The sliding console door 504 of the internal console opens to the external console for the user to insert or pick up the package. In FIG. 14 the sliding console door is shown in closed position. According to a preferred embodiment the external console comprises a shell, a user interface e.g. a touch screen 606a, two scanners and an ADA (Americans with Disabilities Act)-compliant headphone jack with a volume control button. In order to gain easy access to these items for maintenance purposes the external console can be opened for example via hinge mechanism.

The outer shell of the terminal is preferably composed by interlocking sheet metal panels 607 which are fixed onto the shelf columns and outer frames of the inner structure. The pitch of the sheet metal panels matches the pitch of the shelf columns, thus enabling easy modularization of the parcel terminals length. The panels can be covered as desired, e.g. different color choices, advertisement areas etc. The panels cover the parcel terminal from all four sides and from above. An anti-collision bollard 608 is attached to the outer shell to preserve the visual look of the parcel terminal in areas where shopping carts are used and may collide with the panels.

Operation Logic of the Terminal

FIGS. 15, and 16 illustrate flow chart of operations of the terminal. The self-service parcel terminal may be connected to a server in order to process data, generate user and parcel codes and for identifying users with the web application or smart device application, as well as sending data to the parcel terminal. The self-service parcel terminal may include computing hardware for carrying out the above-noted processes of FIGS. 15, and 16, as well as other functionalities, steps, etc. of this disclosure. In an embodiment, the self-service parcel terminal may include a first computing device, such as a general purpose computer having a computer-readable memory with instructions and a processor executing those instructions, that provides the user interface, effects communications with the server, and initiates commands to move the mast, the loader, and other mechanical components of the terminal. The terminal may further include a second computing device that controls the precise movement of the mast, the loader and other mechanical components. The second computing device may receive movement commands from the first processing device and transmit movement instructions to the mechanical components. In one embodiment the second computing device may be a programmable logic controller (PLC). The second computing device may also control other processes, in an embodiment, responsive to input from the scanner and/or first computing device. It should be noted that, although specific computing hardware is noted above for the first and second computing devices, any type of appropriate computing hardware may be used for any computing device in the self-service parcel terminal, including but not limited to a general-purpose computer, a PLC, another programmable logic device (PLD), an application-specific integrated circuit (ASIC), etc. It is obvious that the same self-service parcel terminal may work as local device without any help of server if pre-programmed so. Further, it should be noted that functions, processes, steps, etc. of this disclosure that are carried out by such computing devices may be embodied in any combination of software, digital hardware, and analog hardware. Still further, although two computing devices are explicitly described above, it should be appreciated that the functions, processes, steps, etc. of this disclosure may be carried out by a single computing device, by two computing devices, or by more than two computing devices of the self-service parcel terminal.

Parcel Entry

1. User touches the display at the external console 606 and the display becomes active.
2. User selects "parcel entry/insert parcel" from the display.
3. User scans or enters the order number.
4. Registry software forwards the horizontal and vertical co-ordinates of the nearest empty parcel tray 100 to the terminal's operational software.
5. Mast drive motor 401 engages with the drive belt 420 and moves the mast 400 horizontally into front of the designated pair of shelf supports 602a.
6. Simultaneously the lift drive motor 409 engages with the pulley system 410 and lift drive belts 411 and moves the loader 200 vertically into front of/to the height of the empty parcel tray 100 between the pair of shelf supports 602a (counterweights 412 move vertically in the opposite direction).
7. Loader's electric motor 203 engages with the drive belt system 205 and moves the magnetic head 300 horizontally against the steel plate 102 of the parcel tray 100 between the pair of shelf supports 602a.

8. At the end position of the magnetic head 300, the electromagnet 301 is engaged and attaches the parcel tray 100 onto the magnetic head 300.
9. Sensor 304 registers attachment of the parcel tray 100.
10. Loader's electric motor 203 is reversed and moves the magnetic head 300 with the parcel tray 100 out from the shelf column 602*b* (formed in between the pair of shelf supports 602*a*).
11. Home sensor 208 registers retrieval of the magnetic head 300.
12. Mast drive motor 401 engages with the drive belt and moves the mast 400 horizontally in front of the internal console 500.
13. Simultaneously the lift drive motor 409 engages with the pulley system 410 and drive belts 411 and aligns the loader (to the height of console's guiderails) 200 vertically with the guiderails 502 in the internal console 500.
14. Loader's electric motor 203 engages with the drive belt system 205 and moves the magnetic head 300 with the parcel tray 100 horizontally into the internal console 500.
15. Simultaneously end of the parcel tray 100 engages with the swivel lock mechanism 508, the mechanism swivels and disengages from the locking pin 514.
16. Door home sensor 516 registers opening of the door and light curtains 515 are engaged.
17. The magnetic head 300 continues to push the parcel tray into the internal console 500 while the carriage 507 moves horizontally along the horizontal slides 505, door counterweight 509 moves up along the vertical guiderails 506 and console sliding door 504 moves down toward open position along the guiderails 512.
18. Magnetic head 300 with the parcel tray 100 reach their end position along the guiderails 502 and loader's electric motor 203 is disengaged.
19. Light and/or sound signal is given to the user.
20. User places the parcel onto the parcel tray 100.
21. Light curtains 515 register the placement of the parcel.
22. Loader's electric motor 203 engages with the drive belt system 205 and pulls the magnetic head 300 horizontally with the parcel tray 100 out of the internal console 500.
23. Simultaneously the carriage 507 moves horizontally along the horizontal slides 505 (still supported by the parcel tray) from the force of the counterweight 509 while the counterweight 509 moves down along the vertical guiderails 506 and console sliding door 504 moves up to a closed position along the guiderails 512.
24. At a certain point, locking teeth 513 of the swivel lock mechanism 508 engage with the locking pin 514 due to the pressure from a spring mechanism 519 and movements of the console sliding door 504 and counterweight 509 are stopped.
25. Door home sensor 516 registers closing of the door and light curtains 515 are disengaged.
26. Loader's magnetic head 300 moves away from the locked swivel lock mechanism 508 and the parcel tray 100 is pulled out of the internal console 500.
27. Optical sensors 518 detect that the parcel is not oversized widthwise. If any oversize is detected, the parcel tray 100 is pushed back into the internal console 500.
28. Measurement curtains 503 register the height of the parcel.
29. Registry software finds an optimal location for the parcel in between the shelf supports 602*a* based on its height and forwards the parcel's horizontal and vertical co-ordinates to the machine's operational software.
30. Home sensor 208 registers retrieval of the magnetic head 300.
31. Mast drive motor 401 engages with the drive belt and moves the mast 400 horizontally to front of the designated pair of shelf supports 602*a*.
32. Simultaneously the lift drive motor 409 engages with the pulley system 410 and lift drive belts 411 and moves the loader 200 vertically in front of the designated parcel location between the pair of shelf supports 602*a* (i.e. in front of the target shelf in shelf column 602*b*) (counterweights 412 move vertically in the opposite direction).
33. Loader's electric motor 203 engages with the drive belt system 205 and moves the magnetic head 300 horizontally with the parcel tray 100 into between two shelf supports 602*a* (i.e. to the shelf nr XX).
34. At the end position of the magnetic head 300 the loader's electric motor 203 is disengaged, electromagnet 301 is disengaged and pushers 302 push the parcel tray 100 off from the magnetic head 300.
35. Sensor 304 registers unattachment of the parcel tray 100.
36. Loader's electric motor 203 is reversed and moves the magnetic head 300 without the parcel tray 100 out from the shelf column between the pair of shelf supports 602*a*.
37. Home sensor 208 registers retrieval of the magnetic head 300.
38. Mast 400 and loader 200 are placed into their parking positions/idle position in front of the internal console 500 and the cycle is completed.
39. Alternatively, if the user would like to add more parcels 20 onto multiple parcel trays 100 with the same order number, user selects multiple parcel insertion with the same order and the process continues from the point 4.

Parcel Retrieval

1. User touches the display at the external console 606 and the display becomes active.
2. User selects "parcel retrieval" from the display.
3. User scans or enter the order number.
4. Registry software matches the order number with the parcel location in the machine and forwards the parcel's horizontal and vertical co-ordinates to the machine's operational software.
5. Mast drive motor 401 engages with the drive belt and moves the mast 400 horizontally in front of the designated pair of shelf supports 602*a*.
6. Simultaneously the lift drive motor 409 engages with the pulley system 410, drive belts 411 and moves the loader 200 vertically in front of the designated parcel tray 100 in the pair of shelf supports 602*a* (counterweights 412 move vertically in the opposite direction).
7. Loader's electric motor 203 engages with the drive belt system 205 and moves the magnetic head 300 horizontally against the steel plate 102 of the parcel tray 100 locating in the shelf column 602*b* between the pair of shelf supports 602*a*.
8. At the end position of the magnetic head 300, the electromagnet 301 is engaged and attaches the parcel tray 100 onto the magnetic head 300.
9. Sensor 304 registers attachment of the parcel tray.
10. Loader's electric motor 203 is reversed and moves the magnetic head 300 with the parcel tray 100 out from the shelf column 602*b* between the pair of shelf supports 602*a*.
11. Home sensor 208 registers retrieval of the magnetic head 300.
12. Mast drive motor 401 engages with the drive belt and moves the mast 400 horizontally in front of the internal console 500.

13. Simultaneously the lift drive motor 409 engages with the pulley system 410 and drive belts 411 and aligns the loader 200 vertically with the guiderails 502 in the internal console 500.
14. Loader's electric motor 203 engages with the drive belt system 205 and moves the magnetic head 300 horizontally with the parcel tray into the internal console 500.
15. End of the parcel tray 100 engages with the swivel lock mechanism 508, the mechanism swivels and disengages from the locking pin 514.
16. Door home sensor 516 registers opening of the door and light curtains 515 are engaged.
17. The magnetic head 300 continues to push the parcel tray into the internal console 500 while the carriage 507 moves horizontally along the horizontal slides 505, door counterweight 509 moves up along the vertical guiderails 506 and console sliding door 504 moves down to an open position along the guiderails 512.
18. Magnetic head 300 with the parcel tray 100 reach their end position along the guiderails 502 and loader's electric motor 203 is disengaged.
19. Light and/or sound signal is given to the user.
20. User removes the parcel from the parcel tray 100.
21. Light curtains 515 register removal of the parcel.
22. Loader's electric motor 203 engages with the drive belt system 205 and moves the magnetic head 300 horizontally with the parcel tray out of the internal console 500.
23. Simultaneously the carriage 507 moves horizontally along the horizontal slides 505 (still supported by the parcel tray) from the force of the counterweight 509 while the counterweight 509 moves down along the vertical guiderails 506 and console sliding door 504 moves up along the guiderails 512.
24. At a certain point, locking teeth 513 of the swivel lock mechanism 508 engage with the locking pin 514 due to the pressure from a spring mechanism and movements of the console sliding door 504 and counterweight 509 are stopped.
25. Door home sensor 516 registers closing of the door and light curtains 515 are disengaged.
26. Loader's magnetic head 300 moves away from the locked swivel lock mechanism 508 and the parcel tray 100 is pulled out of the internal console 500.
27. Measurement curtains 503 register that the parcel has been removed.
28. Registry software finds an optimal location for the empty parcel tray 100 in the shelf columns
29. Home sensor 208 registers retrieval of the magnetic head 300.
30. Mast drive motor 401 engages with the drive belt and moves the mast 400 horizontally in front of the designated pair of shelf supports 602a.
31. Simultaneously the lift drive motor 409 engages with the pulley system 410 and drive belts 411 and moves the loader 200 vertically in front of the designated parcel location between the pair of shelf supports 602a (i.e. in front of the target shelf) (counterweights 412 move vertically in the opposite direction).
32. Loader's electric motor 203 engages with the drive belt system 205 and moves the magnetic head 300 horizontally with the empty parcel tray 100 in the shelf column 602b between the pair of shelf supports 602a (i.e. to the shelf nr XX).
33. At the end position of the magnetic head 300 the loader's electric motor 203 is disengaged, electromagnet 301 is disengaged and pushers 302 push the empty parcel tray 100 off from the magnetic head 300.
34. Sensor 304 registers unattachment of the parcel tray 100.
35. Loader's electric motor 203 is reversed and moves the magnetic head 300 without the parcel tray 100 out from the shelf column 602b in between the pair of shelf supports 602a.
36. Home sensor 208 registers retrieval of the magnetic head 300.
37. Mast 400 and loader 200 are placed into their parking positions/idle position in front of the internal console 500 and the cycle is completed.
38. Alternatively, if there are multiple parcels 20 on multiple parcel trays 100 associated with the same order number, the process continues automatically from the point 4.

Safety Features of the Terminal in Normal Operation

The safety of the user when operating the parcel terminal is ensured by the combination of mechanics and safety sensors.

In a normal working situation where the mast 400 is being moved horizontally and loader 200 is being mover vertically, user has no access to the moving parts of the terminal, as the console sliding door 504 is closed and mechanically locked by the locking teeth 513 of the swivel lock mechanism 508. The locked state of the door is verified by the door home sensor 516.

Door is opened only when a parcel tray 100 is inserted into the internal console 500. At that point the door home sensor 516 with designated safety class registers the opening of the console sliding door 504 and switched on the light curtains 515 with designated safety class. When a user places his or her hand between the console sliding door 504 and arriving parcel tray 100 the light curtains register the obstruction and immediately stop the movement of the parcel tray 100 and thus the console sliding door 504. The movement of the parcel tray is continued only once the obstruction from between the light curtains 515 is removed.

The door closes on its own when the parcel tray 100 is removed from the internal console 500 due to the force from the counterweight 509 but the closing process is controlled additionally by the movement of the parcel tray 100. The light curtains 515 remain switched on as long as the door home sensor 516 has no "door closed" signal. When a user places his or her hand between the support structure 501 and console sliding door 504 the light curtains register the obstruction and immediately stop the movement of the parcel tray 100 and thus the console sliding door 504. The movement of the parcel tray is continued only once the obstruction from between the light curtains 515 is removed.

Safety Features in Special Cases

Safety of the user is considered in various special situations as illustrated below.

a) Signal from the door home sensor 516 is lost.

Light curtains 515 remain activated and stop any mechanical movements of the parcel terminal while being obstructed. Parcel terminal registers an error as a parcel tray is not in the internal console 500 while the door home sensor 516 has no signal.

b) Light curtains 515 fail to detect an obstruction when door is being closed.

The counterweight of the door mechanism is chosen such that even if the user places his or her hand between the console sliding door 504 and support structure 501 the force from the door is low enough so the user can hold back the door with the hand. Furthermore, the door closes in an upward movement, thus not acting as a guillotine.

c) Drive belt 510 of the console sliding door 504 mechanism breaks.

Console sliding door 504 moves down and opens, door home sensor 516 activates the light curtains 515 and these stop any further mechanical movements of the parcel terminal while being obstructed. Parcel terminal registers an error as a parcel tray is not in the internal console 500 while the door home sensor 516 has no signal.

d) User holds down the console sliding door 504 while parcel tray 100 is removed from the internal console.

Light curtains 515 detect an obstruction and stop any mechanical movements of the parcel terminal. If curtains fail to detect an obstruction, the console sliding door 504 will close on its own and lock into position once the user has disengaged from the door. If user does not disengage from the door after certain time has passed, parcel terminal registers and error as a parcel tray is not in the internal console 500 while the door home sensor 516 has no signal.

Mast and Lift Movement Synchronization (Synchro-Move)

This operation is described in flow chart of FIG. 17. In a self-service parcel terminal with one insertion and extraction point the movement speeds of mast 400 and loader 200 lift are maximized within the strength limits of the participating elements in order to provide as fast parcel insertion and extraction as possible. Parcel insertion and extraction speeds are important for customer and courier in order to reduce their waiting times at the terminal. However, the faster the speeds, the more expensive elements are necessary to realize the associated movements.

In known solutions the movement speed of the longer movement axis is faster, and the speed of the shorter axis is slower. This enables to provide fast servicing of customers and enables to reduce required material for one of the axes and thus cost and energy consumption of the machine.

However, the vertical and horizontal travel distances in the parcel terminal continuously vary due to the variation in both the starting position and desired end position (vertical and horizontal co-ordinates) of the mast and the loader. This results in a phenomenon where one of the axes reaches its end position earlier than the other without any gain in the insertion and extraction speed of the parcel and results in unnecessary high stress on that particular axis.

In this disclosure solution is provided where this phenomenon is eliminated due to control logic of the computing device of the terminal. When movement commands from the control logic of the computing device are issued to the mast and lift assembly moving the loader, their starting horizontal and vertical co-ordinates are evaluated against the desired horizontal and vertical co-ordinates. The desired movement distances and travel times are calculated with maximum allowed speeds of the axes. The axis with the longer travel time is now taken as a benchmark and the speed of the other axis is reduced to a level where travel times for both of the axes are equal. Thus the horizontal movement of the mast and the vertical movement of the loader synchronized in a manner that each of them reaches their predetermined destination at the same time.

This operational mode enables to reduce the fatigue loads on the participating components for both axes without reducing the parcel insertion and extraction speed. As a result, the participating components can be designed with lower cost or can have a longer lifetime and service intervals.

Extreme Weight Control (EWC)

In a self-service parcel terminal with one insertion and extraction point the movement speeds of mast 400 and loader 200 lift are maximized within the strength limits of the participating elements in order to provide as fast parcel insertion and extraction as possible. Fast parcel insertion and extraction speeds are important for customer and courier in order to reduce their waiting times at the terminal. However, the possible maximum speeds also depend on the weight of the parcels that are moved inside the machine. Generally, the parcel weights are also subjected to maximization within the strength limits of the participating elements in order to allow for customers to extract or insert as large population of parcels as possible. However, the faster the speeds and heavier the parcels, the more expensive elements are necessary to realize the movements.

In known solutions the allowed parcel weights are limited up to a certain theoretical number and parcels are moved with same speed regardless of their weight. This results in non-optimal speed distribution where light parcels are moved unnecessary slow. In certain embodiments the parcels are weighed during insertion which allows to move them according to their weight. However, the elements to facilitate weighing are expensive and add additional complexity to the terminal. In case parcel weighing is not implemented, the parcel weight restriction is only theoretical, as customers still have a possibility to insert heavier parcels and therefore endanger the machine with high loads.

In the self-service parcel terminal described here, these shortcomings are eliminated by control logic of the computing device of the terminal. When movement commands from the control logic of the computing device are issued to the magnetic head, mast and loader lift, the loads (driving current) on the electrical motors are constantly monitored by the built-in monitoring device of the motors. When the loads reach a certain limit, the speed and acceleration of the motors are adjusted (no longer increased or even reduced) in a manner where the loads are constantly kept under the limit.

This operational mode enables to reduce the fatigue loads on the participating components as heavier parcels are automatically moved with lower speeds. As a result, the participating components can be designed with lower cost or can have a longer lifetime and service intervals. Furthermore, the elements that facilitate movement of the axes are automatically protected against insertion of parcels that are heavier than allowed.

Additionally, the monitoring of the motor loads can be used as driving parameters for the acceleration and speed of the axes, so as all parcels are always moved with maximum allowed motor load. This would enable to greatly increase the insertion and extraction speed of parcels in case they are considerably lighter than the maximum allowed parcel weight.

Example 1 of the Use

User approaches the external console and touches the display to activate it. User scans or enters the order number. Upon receiving the order number, the computerized system causes the following: the mast moves the loader to front of the parcel tray that contains client's goods. The magnetic head of the loader moves against parcel tray's magnetic plate, attached and pulls the parcel tray onto itself. The mast moves the loader to the internal console loading position. Loader pushes the parcel tray into the internal console. The parcel tray interacts with the sliding door opening mechanism. The door is unlocked and opened. The client can retrieve the goods from the parcel tray. Once the goods have been removed or certain time has passed, the loader pulls the parcel tray from the internal console. Consequently, the door slides up and locks into position. The loader and mast store the parcel tray at a designated spot.

Example 2 of the Use

Courier approaches the external console and touches the display to activate it. Courier scans the barcode or enters relevant information via the display. The computerized system causes the following: An empty parcel tray is brought to the internal console. The parcel tray interacts with the sliding door opening mechanism. The door is unlocked and opened. Once the parcel tray reaches the end position in the internal console the light curtains are deactivated, now courier can place a parcel into the parcel tray. The loader retracts the parcel tray from the internal console, door closes and locks. The parcel tray passes through measurement curtains where its height is measured, mast and loader place the parcel into an optimal spot in the machine. The process is repeated until all parcels have been inserted into the machine.

ELEMENT LISTING

10—automated parcel terminal
12—outer shell of the terminal
20—parcel
100—parcel tray
101—tray base
102—metal/steel plate
200—loader
201—main frame
202—guiderails
203—electric motor
204—linear guiderail system
205—drive belt system
206—adjustment screws
207—plates
208—home sensor
209—rollers
210—adjustable plates
300—magnetic head
301—electromagnet
302—pushers
303—housing
304—sensor
400—mast
401—mast drive motor
402—carriage
403—drive belt system
404—upper support rollers
405—lower support rollers
406—bottom plate
407—bottom guide rollers
408—beams
409—lift drive motor
410—drive pulley systems
411—drive belts
412—counterweights
413—homing sensor
414—camera
415—homing sensor
416—top plate
417—groove of the beam
418—counterweight slider
419—vertical guiding groove
420—mast's drive belt
500—internal console
501—support structure
502—guide rails
503—measurement curtains
504—console sliding door
505—horizontal slides
506—vertical slides
507—carriage
508—swivel lock mechanism
509—counterweight
510—L-shaped drive belt loop
511—drive belt pullies
512—guiderails
513—locking teeth
514—locking pin
515—light curtains
516—home sensor
517—counter
518—optical sensors
519—spring mechanism
520—bracket
600—internal structure
601—mast top rail
601a—upper mast rail contour
601b—lower mast rail contour
602—shelf structure
602a—shelf supports
602b—shelf column
603—outer frame
604—mast bottom rail
605—support beams
606—external console
606a—touch screen
607—sheet metal panels
608—anti-collision bollard

What is claimed is:

1. An automated parcel terminal comprising:
an outer shell and an internal structure;
the outer shell comprising an external console for user identification, communication between the user and the terminal, and for retrieval or deposit of a parcel;
the internal structure comprising:
at least one row of vertical shelf supports to adapt a multitude of parcel trays in between the supports,
a mast moving horizontally along a top rail and a bottom rail and in parallel to the at least one row of shelf supports,
a loader configured to move vertically on the mast and being capable of gripping a parcel tray with or without a parcel via an attachment mechanism, and moving the tray horizontally in a direction perpendicular to the moving direction of the mast, and
an internal console located between two shelf supports within the at least one row of vertical supports;
the internal console comprising:
a support structure onto which a pair of parcel tray guiderails are attached,
a console sliding door,
light curtains, and
a mechanism to operate the sliding door,
wherein the mechanism to operate the sliding door comprises a horizontal slide supporting a swivel lock mechanism, a vertical slide comprising a counterweight, and an L-shaped drive belt loop connecting the swivel lock mechanism, the counterweight, and the console sliding door such that the door moves upward to a closed position and downward to an open position via front-to-back movement of the swivel lock mechanism on the horizontal slide, and wherein the door sliding downward to the open position is initiated when a parcel tray is pushed by the loader on to an end position on the guiderails, and the door sliding upward to the closed position is initiated when the parcel tray is pulled off by the loader from the guiderails and the counterweight moves the swivel lock mechanism to end of the horizontal slide where locking teeth engage with a locking pin so as to make it impossible to open the door from outside.

2. The automated parcel terminal of claim 1, wherein the attachment mechanism of the loader comprises a horizontally moving magnetic head on the loader and the parcel trays having a metal portion for an electromagnet of the magnetic head to attach.

3. The automated parcel terminal of claim 1, wherein the mast comprises a mast motor on top of a mast structure configured to move the mast horizontally in the parcel terminal and a lift assembly configured to move the loader vertically along the mast, wherein the lift assembly comprises:
   two vertical hollow beams both of which have vertical guiding grooves for adapting rollers of the loader to movably attach the loader in between the beams;
   a lift drive motor and a drive pulley system on top of the mast structure; and
   two open ended drive belts running partially inside the beams and having one end of each belt connected to the loader and the other end of each belt connected to a counterweight and the counterweight moving vertically inside the hollow beam and being guided along grooves on the inner surface of the beam.

4. The automated parcel terminal of claim 3, wherein the hollow beams have a flat U-shape cross section and the counterweight moves vertically in the inner space of the U-shape.

5. The automated parcel terminal of claim 3, wherein the counterweight has a slider fitting into the groove for guiding the movement of the counterweight.

6. A mechanism to open and close a sliding door of an internal console of an automated parcel terminal, wherein the mechanism comprises:
   an L-shaped continuous drive belt loop having a horizontal part and a vertical part, the drive belt looping around pulleys at both ends of its L-shaped form;
   a carriage supporting a swivel lock mechanism connected to the horizontal part of the drive belt,
   a counterweight connected to a back side of the vertical part of the drive belt loop and the sliding door connected to a front side of the vertical part of the drive belt loop,
   wherein the carriage is configured to move forward when a parcel tray is inserted into the internal console causing the drive belt loop to move in a direction pulling the sliding door downward into an open position, and the carriage further being configured to move backward when the parcel tray is removed from the internal console causing the drive belt to move in a direction pulling the sliding door upward into a closed position and the swivel lock to move to a locked position preventing opening of the door from outside.

7. A method to operate a sliding door of a self-service parcel terminal, wherein the method comprises:
   opening the sliding door when:
   upon a loader inserting a parcel tray onto tray guiderails in an internal console of the terminal, an end of the parcel tray engages with a swivel lock mechanism supported on a carriage on a horizontal slide in the internal console causing the swivel lock mechanism to disengage from a locking pin, and
   upon the loader pushing the tray further into the internal console along the tray guiderails the carriage connected to a counterweight and to the sliding door moves forward along the horizontal slide and causes the counterweight to move upward along a vertical slide and the sliding door moves down in an open position;
   and closing the sliding door when:
   the loader pulling the parcel tray back from the internal console of the terminal, the carriage connected to the counterweight and to the sliding door, moves backward along the horizontal slide and causes the counterweight to move downward along the vertical slide and the sliding door moves upward in a closed position; and
   locking the door when:
   the end of the parcel tray disengages with the swivel lock mechanism on the horizontal slide in the console causing the swivel lock mechanism to engage with the locking pin locking the door in closed position.

8. The method of claim 7, wherein the carriage, the counterweight and the sliding door are connected via an L-shaped drive belt loop.

9. The method of claim 8, wherein the drive belt loop is arranged in a L-shaped form via pullies at each end of the horizontal and vertical slides.

* * * * *